(12) United States Patent
Koyabu et al.

(10) Patent No.: US 8,311,104 B2
(45) Date of Patent: Nov. 13, 2012

(54) INFORMATION PROCESSING APPARATUS AND METHOD, RECORDING MEDIUM, AND PROGRAM

(75) Inventors: Kyohei Koyabu, Kanagawa (JP); Takaaki Fuchie, Kanagawa (JP); Hiromi Yoshinari, Kanagawa (JP)

(73) Assignee: Sony Corporation, Tokyo (JP)

( * ) Notice: Subject to any disclaimer, the term of this patent is extended or adjusted under 35 U.S.C. 154(b) by 1604 days.

(21) Appl. No.: 11/507,270

(22) Filed: Aug. 21, 2006

(65) Prior Publication Data

US 2007/0041441 A1 Feb. 22, 2007

(30) Foreign Application Priority Data

Aug. 22, 2005 (JP) ................................ 2005-239829

(51) Int. Cl.
- *H04N 11/02* (2006.01)
- *H04N 11/04* (2006.01)
- *H04N 7/12* (2006.01)

(52) U.S. Cl. ............ 375/240.12; 375/240.26; 348/419.1

(58) Field of Classification Search ..... 375/240–240.27; 348/413.1, 419.1, 425.1, 571, 705
See application file for complete search history.

(56) References Cited

U.S. PATENT DOCUMENTS

| | | | |
|---|---|---|---|
| 6,269,120 B1 * | 7/2001 | Boice et al. | 375/240.12 |
| 6,301,428 B1 * | 10/2001 | Linzer | 386/278 |
| 6,347,117 B1 | 2/2002 | Kato et al. | |
| 6,396,875 B1 * | 5/2002 | Martin | 375/240.25 |
| 6,414,998 B1 | 7/2002 | Yoshinari et al. | |
| 6,522,693 B1 * | 2/2003 | Lu et al. | 375/240.02 |
| 6,532,242 B1 | 3/2003 | Tahara | |
| 6,535,556 B1 | 3/2003 | Kato et al. | |
| 6,567,471 B1 | 5/2003 | Yoshinari | |
| 6,587,506 B1 * | 7/2003 | Noridomi et al. | 375/240.12 |
| 6,611,624 B1 * | 8/2003 | Zhang et al. | 382/232 |
| 6,724,977 B1 * | 4/2004 | Linzer | 386/278 |
| 6,760,377 B1 * | 7/2004 | Burns et al. | 375/240.15 |
| 6,983,015 B1 * | 1/2006 | Saunders et al. | 375/240.1 |
| 2002/0080875 A1 * | 6/2002 | Tahara et al. | 375/240.02 |
| 2002/0136310 A1 * | 9/2002 | Saunders et al. | 375/240.25 |

FOREIGN PATENT DOCUMENTS

| | | |
|---|---|---|
| JP | 9 282762 | 10/1997 |
| JP | 9 331524 | 12/1997 |
| JP | 2001 197504 | 7/2001 |
| JP | 2002 176648 | 6/2002 |

(Continued)

*Primary Examiner* — Joseph Ustaris
*Assistant Examiner* — Hang Gao
(74) *Attorney, Agent, or Firm* — Frommer Lawrence & Haug LLP; William S. Frommer; Thomas F. Presson

(57) ABSTRACT

An information processing apparatus controlling processing for splicing first and second compressed image data at an editing point includes acquiring means for acquiring the code amounts of the first compressed image data near the start point and the second compressed image data near the end point of a first range around the editing point; analyzing means for analyzing, in accordance with the code amounts, a first locus of virtual buffer occupancies when the virtual buffer occupancy at the start point is minimum and a second locus of virtual buffer occupancies when the virtual buffer occupancy of a picture next to the end point is maximum; and determining means for determining, in accordance with the first locus and the second locus, an upper limit and a lower limit of the virtual buffer occupancy at the start point and the end point, respectively, when the first range is re-encoded.

20 Claims, 13 Drawing Sheets

FOREIGN PATENT DOCUMENTS

| | | |
|---|---|---|
| JP | 2002 320228 | 10/2002 |
| WO | WO 97 39558 | 10/1997 |
| WO | WO 99 05864 | 2/1999 |
| WO | WO 2006 022221 | 3/2006 |

* cited by examiner

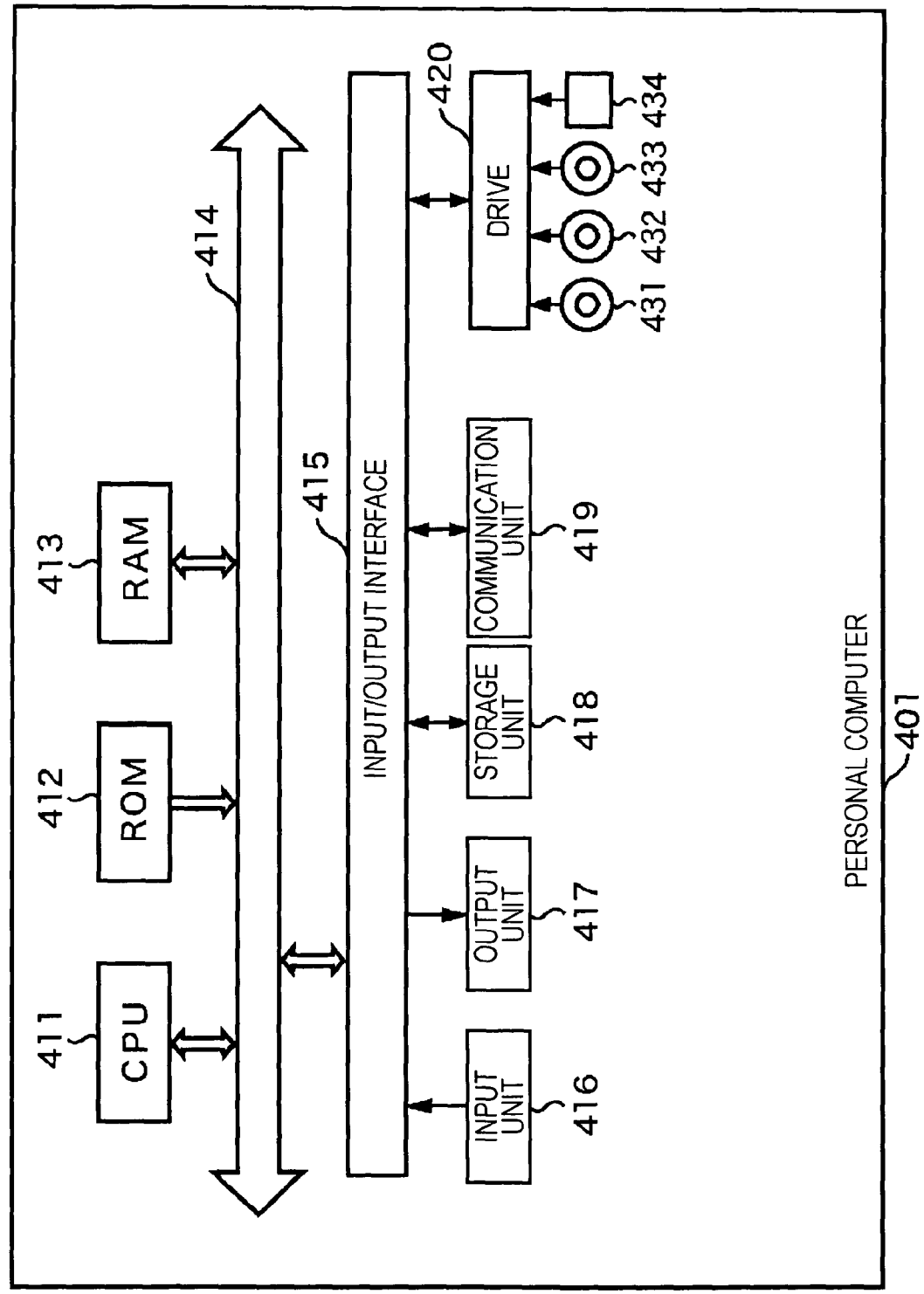

INFORMATION PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2005-239829 filed in the Japanese Patent Office on Aug. 22, 2005, the entire contents of which are incorporated herein by reference.

BACKGROUND OF THE INVENTION

1. Field of the Invention

The present invention relates to information processing apparatuses, information processing methods, recording media, and programs, and more particularly, to an information processing apparatus, an information processing method, a recording medium, and a program suitable for editing variable-bit-rate (VBR) compressed image data.

2. Description of the Related Art

Processing for performing editing by splicing two pieces of compressed image data at a predetermined editing point will be described with reference to FIG. 1.

Portions of compressed image data 1 and 2 near an editing point are decoded, and uncompressed image signals 1 and 2 are obtained. The uncompressed image signals 1 and 2 are spliced together at the editing point. An effect is applied near the editing point according to need, and re-encoding is performed. The re-encoded compressed image data is spliced with compressed image data that is not decoded or re-encoded (that is, compressed image data in areas other than the decoded portions near the editing point).

The method described with reference to FIG. 1 has advantages in that deterioration of image quality due to re-encoding can be locally suppressed and an editing processing time can be significantly reduced, compared with a method for acquiring edited compressed image data by decoding all the compressed image data to be edited, splicing image signals together at an editing point, and re-encoding all the image signals.

In addition, in generation of compressed images (encoding), which is typified by a Moving Picture Experts Group (MPEG) technology, it is necessary to control the amount of generated code on the basis of a virtual decoder model called a video buffering verifier (VBV) buffer such that the VBV buffer does not overflow or underflow. If the VBV buffer does not perform a normal operation, a buffer in a receiving decoder underflows, and image quality is deteriorated due to data missing.

For multiple streams defined by the MPEG 2 system, a layer immediately below each of a transport stream and a program stream is a packetized elementary stream (PES). The header of a PES packet includes information on a control signal for performing scrambling for each packet and cyclic redundancy check (CRC) for error detection, as well as a presentation time stamp (PTS) providing an audio/video presentation time and a decoding time stamp (DTS) providing a decoding start time.

An encoder is capable of controlling the occupancy of a buffer in accordance with a DTS, a PTS, and a remaining buffer amount, irrespective of whether or not a stream includes vbv_delay information. However, when the encoder handles a VBR-compressed elementary stream (ES) not involving time information, the value of vbv_delay is fixed at the maximum value. Thus, the encoder is not capable of knowing the occupancy of the buffer. Therefore, the encoder is not capable of determining the occupancy of the buffer only from information on a frame to be encoded.

Thus, when editing is performed by decoding only a portion near an editing point and by performing re-encoding after splicing, as described with reference to FIG. 1, it is difficult to maintain continuity of the occupancy of the buffer while conforming to the standards of the buffer occupancy.

When such a VBR-compressed stream not involving time appointment is encoded, normally, buffer underflow is prevented by starting regeneration from the upper limit of the buffer at a start point of a sequence.

In addition, a technology is available in which when, in order to edit a compressed encoded MPEG stream, pictures in portions near an editing point (splice point) are decoded, uncompressed image signals are spliced together at the editing point, and then re-encoding is performed, the amount of overflow and the amount of underflow are calculated by referring to a locus of virtually acquired occupancies of a VBV buffer in a re-encoding range so as not to cause the buffer overflow or the buffer underflow, and an offset value of a desired amount of code is acquired by calculating a gap of the VBV buffer between the re-encoding range and a switching point of an original stream in which re-encoding is not performed to calculate and set a new desired amount of generated code (See, for example, International Publication No. WO99/05864).

In addition, a technology is available in which when editing is performed by splicing two streams together, breakdown of a buffer is prevented by imposing restrictions on the buffer occupancy in an area previous and subsequent to a splice point of the two streams (see Japanese Unexamined Patent Application Publication No. 9-331524).

SUMMARY OF THE INVENTION

However, if the amount of generated code is restricted in an area around an editing point in the above-described method, the amount of generated code may not be sufficiently assigned to an area near the last picture of a stream generated by re-encoding. Thus, image quality may be significantly deteriorated.

It is desirable to control editing in a VBR stream so as to prevent deterioration of image quality in an area around an editing point.

An information processing apparatus according to a first embodiment of the present invention that controls processing for performing editing by splicing first compressed image data and second compressed image data at an editing point includes acquiring means for acquiring the amount of code of a portion of the first compressed image data in the vicinity of a start point of a first range around the editing point and the amount of code of a portion of the second compressed image data in the vicinity of an end point of the first range around the editing point; analyzing means for analyzing a first locus of virtual buffer occupancies when a case in which the virtual buffer occupancy at the start point is minimum when the portion of the first compressed image data in the vicinity of the start point is decoded and re-encoded is assumed and for analyzing a second locus of virtual buffer occupancies when a case in which the virtual buffer occupancy of a picture next to the end point is maximum when the portion of the second compressed image data in the vicinity of the end point is decoded and re-encoded is assumed, in accordance with the amounts of code acquired by the acquiring means; and determining means for determining, in accordance with the first locus and the second locus analyzed by the analyzing means, an upper limit of the virtual buffer occupancy at the start point and a lower limit of the virtual buffer occupancy at the end point when the first range is re-encoded.

The determining means may determine, as the upper limit of the virtual buffer occupancy at the start point when the first range is re-encoded, the virtual buffer occupancy at the start point in a third locus acquired by modifying the first locus in a direction of an increase in the virtual buffer occupancy by the amount of code of the largest underflow in the first locus in an area that is not included in the first range.

The determining means may determine, as the lower limit of the virtual buffer occupancy at the end point when the first range is re-encoded, the virtual buffer occupancy at the end point in a third locus acquired by modifying the second locus in a direction of a decrease in the virtual buffer occupancy by the amount of code acquired from an integrated value of a period during which the virtual buffer occupancy is maximum and the maximum bit rate in the second locus in an area that is not included in the first range.

The information processing apparatus may further include re-encoding range setting means for setting, as a re-encoding range of the first compressed image data and the second compressed image data that are decoded and spliced together at the editing point, a second range that is wider than the first range in accordance with the first locus and the second locus analyzed by the analyzing means.

The re-encoding range setting means may set, as a start point of the second range, a position at which the virtual buffer occupancy is the highest in the first locus in an area that is not included in the first range.

The re-encoding range setting means may set, as an end point of the second range, a position at which the virtual buffer occupancy is the lowest in the second locus in an area that is not included in the first range.

The determining means may acquire an upper limit of the virtual buffer occupancy at a start point of the second range and a lower limit of the virtual buffer occupancy at an end point of the second range when the second range set by the re-encoding range setting means is re-encoded.

The information processing apparatus may further include decoding means for decoding compressed image data in a predetermined range including the first range from among the first compressed image data and the second compressed image data; splicing means for splicing a first uncompressed image signal generated by decoding of the first compressed image data by the decoding means and a second uncompressed image signal generated by decoding of the second compressed image data by the decoding means at the editing point to generate a third uncompressed image signal; encoding means for re-encoding a portion corresponding to the first range of the third uncompressed image signal spliced and generated by the splicing means to generate third compressed image data in accordance with the upper limit of the virtual buffer occupancy at the start point and the lower limit of the virtual buffer occupancy at the end point that are determined by the determining means; and edited image data generating means for generating compressed encoded edited image data by splicing the first compressed image data in a portion other than the first range, the second compressed image data in a portion other than the first range, and the third compressed image data generated by re-encoding by the encoding means.

An information processing method and program according to the first embodiment of the present invention includes the steps of controlling acquisition of the amount of code of a portion of first compressed image data in the vicinity of a start point of a first range around an editing point and the amount of code of a portion of second compressed image data in the vicinity of an end point of the first range around the editing point; analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed; determining, in accordance with the first locus analyzed by the step of analyzing the first locus, an upper limit of the virtual buffer occupancy at the start point when the first range is re-encoded; analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and determining, in accordance with the second locus analyzed by the step of analyzing the second locus, a lower limit of the virtual buffer occupancy at the end point when the first range is re-encoded.

According to the first embodiment of the present invention, the amount of code of a portion of first compressed image data in the vicinity of a start point of a first range around an editing point and the amount of code of a portion of second compressed image data in the vicinity of an end point of the first range around the editing point are acquired, a first locus of virtual buffer occupancies when a case in which the virtual buffer occupancy at the start point is minimum when the portion of the first compressed image data in the vicinity of the start point is decoded and re-encoded is assumed and a second locus of virtual buffer occupancies when a case in which the virtual buffer occupancy of a picture next to the end point is maximum when the portion of the second compressed image data in the vicinity of the end point is decoded and re-encoded is assumed are analyzed in accordance with the acquired amounts of code, and an upper limit of the virtual buffer occupancy at the start point and a lower limit of the virtual buffer occupancy at the end point when the first range is re-encoded are determined in accordance with the first locus and the second locus, respectively.

An information processing apparatus according to a second embodiment of the present invention that controls processing for performing editing by splicing first compressed image data and second compressed image data at an editing point includes acquiring means for acquiring the amount of code of a portion of the first compressed image data in the vicinity of a start point of a first range around the editing point and the amount of code of a portion of the second compressed image data in the vicinity of an end point of the first range around the editing point; analyzing means for analyzing a first locus of virtual buffer occupancies when a case in which the virtual buffer occupancy at the start point is minimum when the first compressed image data in the first range is decoded and re-encoded is assumed and for analyzing a second locus of virtual buffer occupancies when a case in which the virtual buffer occupancy of a picture next to the end point is maximum when the second compressed image data in the first range is decoded and re-encoded is assumed, in accordance with the amounts of code acquired by the acquiring means; and re-encoding range setting means for setting, as a re-encoding range of the first compressed image data and the second compressed image data that are decoded and spliced together at the editing point, a second range that is wider than the first range in accordance with the first locus and the second locus analyzed by the analyzing means.

The re-encoding range setting means may set, as a start-point of the second range, a position at which the virtual buffer occupancy is the highest in the first locus in an area that is not included in the first range.

The re-encoding range setting means may set, as an end point of the second range, a position at which the virtual buffer occupancy is the lowest in the second locus in an area that is not included in the first range.

The information processing apparatus may further include decoding means for decoding compressed image data in a predetermined range including the second range from among the first compressed image data and the second compressed image data; splicing means for splicing a first uncompressed image signal generated by decoding of the first compressed image data by the decoding means and a second uncompressed image signal generated by decoding of the second compressed image data by the decoding means at the editing point to generate a third uncompressed image signal; encoding means for re-encoding a portion corresponding to the second range set by the re-encoding range setting means of the third uncompressed image signal spliced and generated by the splicing means to generate third compressed image data; and edited image data generating means for generating compressed encoded edited image data by splicing the first compressed image data in a portion other than the second range, the second compressed image data in a portion other than the second range, and the third compressed image data generated by re-encoding by the encoding means.

An information processing method and program according to the second embodiment of the present invention includes the steps of controlling acquisition of the amount of code of a portion of first compressed image data in the vicinity of a start point of a first range around an editing point and the amount of code of a portion of second compressed image data in the vicinity of an end point of the first range around the editing point; analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed; setting, in accordance with the first locus analyzed by the step of analyzing the first locus, a start point of a second range that is a re-encoding range of the first compressed image data and the second compressed image data that are spliced together at the editing point and that is wider than the first range; analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and setting, in accordance with the second locus analyzed by the step of analyzing the second locus, an end point of the second range.

According to the second embodiment of the present invention, the amount of code of a portion of first compressed image data in the vicinity of a start point of a first range around an editing point and the amount of code of a portion of second compressed image data in the vicinity of an end point of the first range around the editing point are acquired, a first locus of virtual buffer occupancies when a case in which the virtual buffer occupancy at the start point is minimum when a portion of the first compressed image data in the vicinity of the start point is decoded and re-encoded is assumed and a second locus of virtual buffer occupancies when a case in which the virtual buffer occupancy of a picture next to the end point is maximum when a portion of the second compressed image data in the vicinity of the end point is decoded and re-encoded is assumed are analyzed in accordance with the acquired amounts of code, and a second range that is wider than the first range is set as a re-encoding range of the first compressed image data and the second compressed image data that are decoded and spliced together at the editing point in accordance with the first locus and the second locus.

As described above, according to the first embodiment of the present invention, processing for performing editing by splicing first compressed image data and second compressed image data at an editing point can be controlled, and, in particular, the buffer occupancies at the start point and the end point of a re-encoding range of the first compressed image data and the second compressed image data that are decoded and spliced together at the editing point can be set such that the flexibility in the amount of generated code to be assigned to the re-encoding range can be increased.

In addition, according to the second embodiment of the present invention, processing for performing editing by splicing first compressed image data and second compressed image data at an editing point can be controlled, and, in particular, a re-encoding range of the first compressed image data and the second compressed image data that are decoded and spliced together at the editing point can be set such that the flexibility in the amount of generated code to be assigned to the re-encoding range can be increased.

BRIEF DESCRIPTION OF THE DRAWINGS

FIG. 12 is a block diagram showing the configuration of a personal computer.

DESCRIPTION OF THE PREFERRED EMBODIMENTS

Before describing preferred embodiments of the present invention, the correspondence between the features of the present invention and embodiments described in the description of the preferred embodiments will be discussed below. This description is intended to assure that embodiments supporting the invention are described in the description of the preferred embodiments. Thus, even if an embodiment described in the description of the preferred embodiments is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

Figure 3:
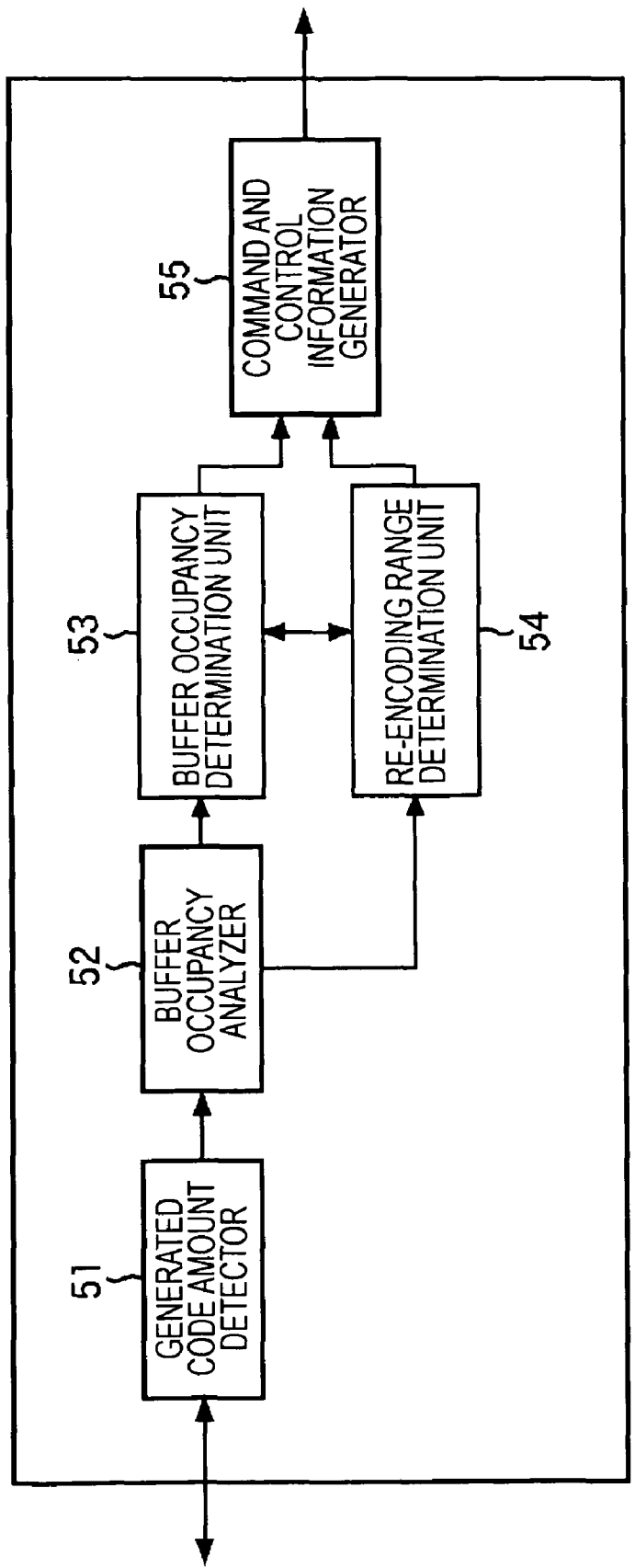
FIG. 3 is a functional block diagram for explaining functions executable by a CPU shown in FIG. 2.

An information processing apparatus (for example, an editing apparatus 1) according to a first embodiment of the present invention that controls processing for performing editing by splicing first compressed image data and second compressed image data at an editing point includes acquiring means (for example, a generated code amount detector 51 shown in FIG. 3) for acquiring the amount of code of a portion of the first compressed image data in the vicinity of a start point of a first range (for example, a default re-encoding range) around the editing point and the amount of code of a portion of the second compressed image data in the vicinity of an end point of the first range around the editing point; analyzing means (for example, a buffer occupancy analyzer 52 shown in FIG. 3) for analyzing a first locus of virtual buffer occupancies when a case in which the virtual buffer occupancy at the start point is minimum when the portion of the first compressed image data in the vicinity of the start point is decoded and re-encoded is assumed and for analyzing a second locus of virtual buffer occupancies when a case in which the virtual buffer occupancy of a picture next to the end point is maximum when the portion of the second compressed image data in the vicinity of the end point is decoded and re-encoded is assumed, in accordance with the amounts of code acquired by the acquiring means; and determining means (for example, a buffer occupancy determination unit 53 shown in FIG. 3) for determining, in accordance with the first locus and the second locus analyzed by the analyzing means, an upper limit of the virtual buffer occupancy at the start point and a lower limit of the virtual buffer occupancy at the end point when the first range is re-encoded.

The information processing apparatus may further include re-encoding range setting means (for example, a re-encoding range determination unit 54 shown in FIG. 3) for setting, as a re-encoding range of the first compressed image data and the second compressed image data that are decoded and spliced together at the editing point, a second range that is wider than the first range in accordance with the first locus and the second locus analyzed by the analyzing means.

The information processing apparatus may further include decoding means (for example, decoders 22 and 23 shown in FIG. 2) for decoding compressed image data in a predetermined range including the first range from among the first compressed image data and the second compressed image data; splicing means (for example, an effect/switch 26 shown in FIG. 2) for splicing a first uncompressed image signal generated by decoding of the first compressed image data by the decoding means and a second uncompressed image signal generated by decoding of the second compressed image data by the decoding means at the editing point to generate a third uncompressed image signal; encoding means (for example, an encoder 27 shown in FIG. 2) for re-encoding a portion corresponding to the first range of the third uncompressed image signal spliced and generated by the splicing means to generate third compressed image data in accordance with the upper limit of the virtual buffer occupancy at the start point and the lower limit of the virtual buffer occupancy at the end point that are determined by the determining means; and edited image data generating means (for example, a stream splicer 25 shown in FIG. 2) for generating compressed encoded edited image data by splicing the first compressed image data in a portion other than the first range, the second compressed image data in a portion other than the first range, and the third compressed image data generated by re-encoding by the encoding means.

An information processing method, program, and program recorded on a recording medium according to the first embodiment of the present invention includes the steps of controlling (for example, processing of step S41 in FIG. 10 or S81 in FIG. 11) acquisition of the amount of code of a portion of first compressed image data in the vicinity of a start point of a first range (for example, a default re-encoding range) around an editing point and the amount of code of a portion of second compressed image data in the vicinity of an end point of the first range around the editing point; analyzing (for example, processing of step S47 in FIG. 10 or step S87 in FIG. 11), in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed; determining (for example, processing of step S49 in FIG. 10 or step S89 in FIG. 11), in accordance with the first locus analyzed by the step of analyzing the first locus, an upper limit of the virtual buffer occupancy at the start point when the first range is re-encoded; analyzing (for example, processing of step S42 in FIG. 10 or step S82 in FIG. 11), in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and determining (for example, processing of step S44 in FIG. 10 or step S84 in FIG. 11), in accordance with the second locus analyzed by the step of analyzing the second locus, a lower limit of the virtual buffer occupancy at the end point when the first range is re-encoded.

An information processing apparatus (for example, the editing apparatus 1) according to a second embodiment of the present invention that controls processing for performing editing by splicing first compressed image data and second compressed image data at an editing point includes acquiring means (for example, the generated code amount detector 51 shown in FIG. 3) for acquiring the amount of code of a portion of the first compressed image data in the vicinity of a start point of a first range (for example, a default re-encoding range) around the editing point and the amount of code of a portion of the second compressed image data in the vicinity of an end point of the first range around the editing point; analyzing means (for example, the buffer occupancy analyzer 52 shown in FIG. 3) for analyzing a first locus of virtual buffer occupancies when a case in which the virtual buffer occupancy at the start point is minimum when the first compressed image data in the first range is decoded and re-encoded is assumed and for analyzing a second locus of virtual buffer occupancies when a case in which the virtual buffer occupancy of a picture next to the end point is maximum when the second compressed image data in the first range is decoded and re-encoded is assumed, in accordance with the amounts of code acquired by the acquiring means; and re-encoding range setting means (for example, the re-encoding range determination unit 54 shown in FIG. 3) for setting, as a re-encoding range of the first compressed image data and the second compressed image data that are decoded and spliced together at the editing point, a second range that is wider than the first range in accordance with the first locus and the second locus analyzed by the analyzing means.

The information processing apparatus may further includes decoding means (for example, the decoders 22 and 23 shown in FIG. 2) for decoding compressed image data in a predetermined range including the second range from among the first compressed image data and the second compressed image data; splicing means (for example, the effect/switch 26 shown in FIG. 2) for splicing a first uncompressed image signal generated by decoding of the first compressed image data by the decoding means and a second uncompressed image signal generated by decoding of the second compressed image data by the decoding means at the editing point to generate a third uncompressed image signal; encoding means (for example, the encoder 27 shown in FIG. 2) for re-encoding a portion corresponding to the second range set by the re-encoding range setting means of the third uncompressed image signal spliced and generated by the splicing means to generate third compressed image data; and edited image data generating means (for example, the stream splicer 25 shown in FIG. 2) for generating compressed encoded edited image data by splicing the first compressed image data in a portion other than the second range, the second compressed image data in a portion other than the second range, and the third compressed image data generated by re-encoding by the encoding means.

An information processing method, program, and program recorded on a recording medium according to the second embodiment of the present invention includes the steps of controlling (for example, the processing of step S41 in FIG. 10 or S81 in FIG. 11) acquisition of the amount of code of a portion of first compressed image data in the vicinity of a start point of a first range (for example, a default re-encoding range) around an editing point and the amount of code of a portion of second compressed image data in the vicinity of an end point of the first range around the editing point; analyzing (for example, the processing of step S47 in FIG. 10 or S87 in FIG. 11), in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed; setting (for example, processing of step S51 in FIG. 10 or S91 in FIG. 11), in accordance with the first locus analyzed by the step of analyzing the first locus, a start point of a second range that is a re-encoding range of the first compressed image data and the second compressed image data that are spliced together at the editing point and that is wider than the first range; analyzing (for example, the processing of step S42 in FIG. 10 or S82 in FIG. 11), in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and setting (for example, processing of step S46 in FIG. 10 or step S86 in FIG. 11), in accordance with the second locus analyzed by the step of analyzing the second locus, an end point of the second range.

Embodiments of the present invention will be described with reference to the drawings.

Figure 1:
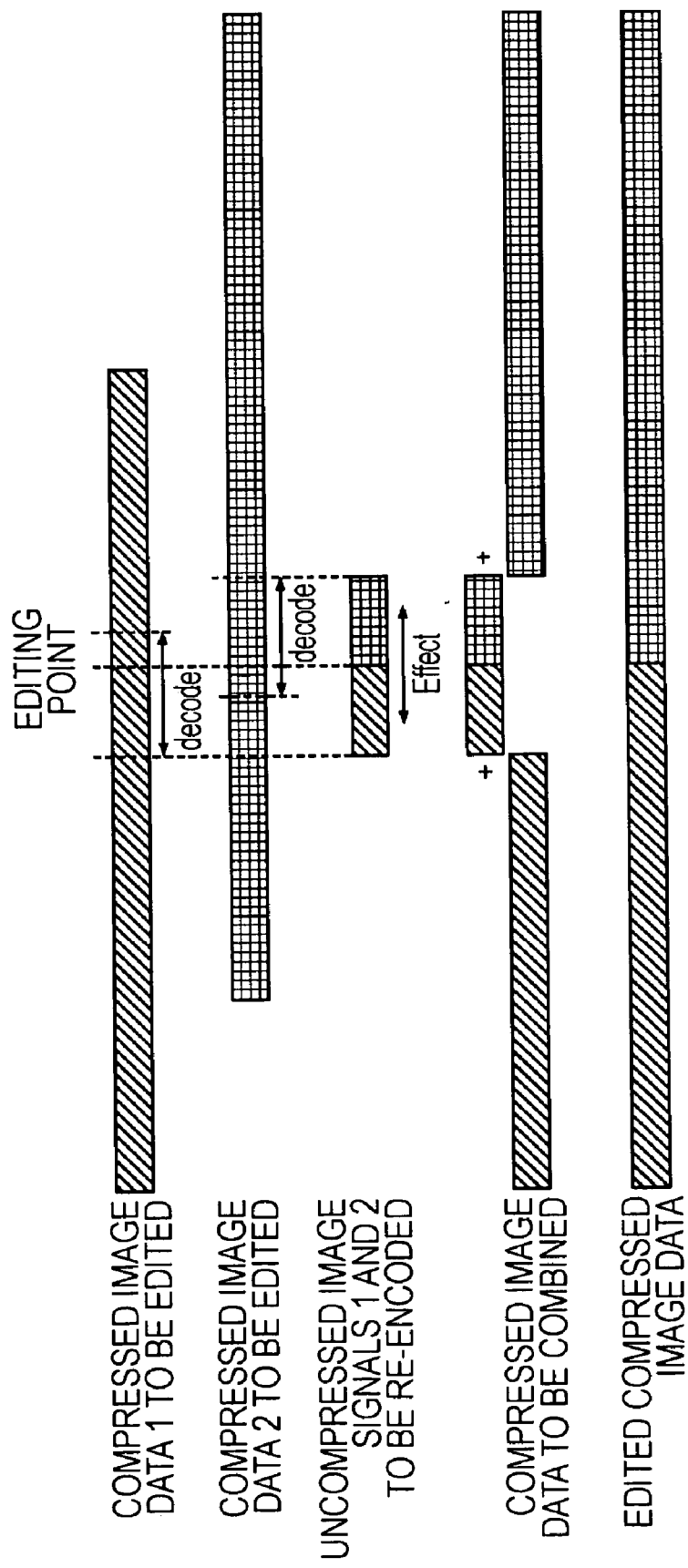
FIG. 1 is an illustration for explaining editing and partial re-encoding.
Figure 2:
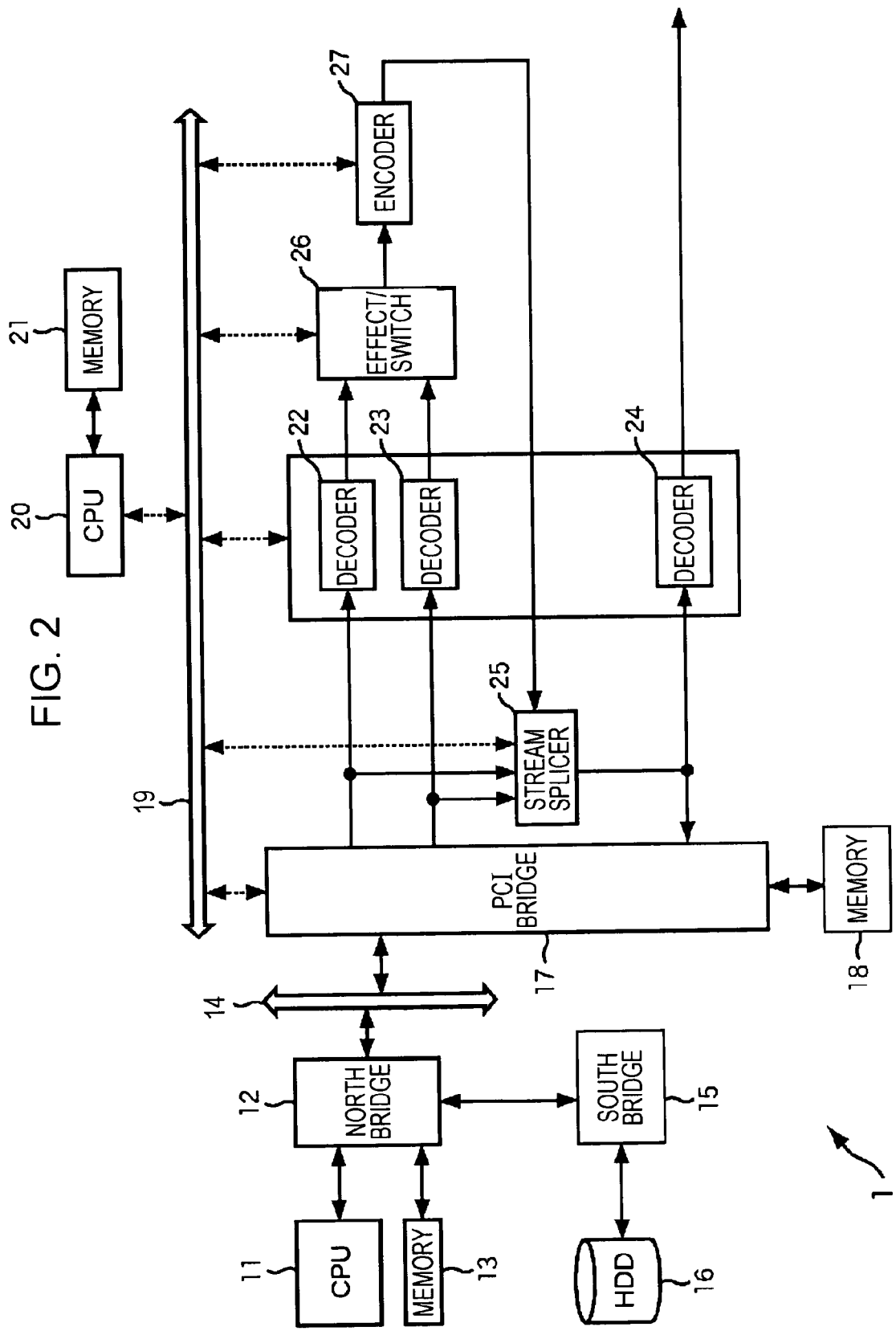
FIG. 2 is a block diagram showing the configuration of an editing apparatus according to an embodiment of the present invention.

FIG. 2 is a block diagram showing the hardware configuration of an editing apparatus 1 according to an embodiment of the present invention.

A central processing unit (CPU) 11 is connected to a north bridge 12. For example, the CPU 11 controls reading of data stored in a hard disk drive (HDD) 16, and generates and outputs commands and control information for controlling editing processing performed by a CPU 20.

When reading two image materials, compressed image data 1 to be edited (hereinafter, referred to as a material 1) and compressed image data 2 to be edited (hereinafter, referred to as a material 2), from the HDD 16 and performing editing by decoding only an area near an editing point and by performing re-encoding after splicing, the CPU 11 is capable of determining a re-encoding range so that the amount of generated code can be sufficiently assigned with less restriction on a buffer occupancy in an area previous and subsequent to a splice point while conforming to the standards of a virtual buffer occupancy when re-encoding is performed and while maintaining continuity of the buffer occupancy between the re-encoding range and an area in which re-encoding is not performed, determining the lower limit of the buffer occupancy at the beginning of the re-encoding range and the upper limit of the buffer occupancy at the end of the re-encoding range, and outputting the set re-encoding range, the determined lower limit and upper limit, together with a command for controlling the editing processing performed by the CPU 20. Setting of the re-encoding range and determination of the buffer occupancies at the beginning and the end of the re-encoding range will be described later. Since a larger amount of generated code can be supplied to the re-encoding range, deterioration of image quality in an area near the editing point can be prevented.

The north bridge 12 is connected to a peripheral component interconnect/interface (PCI) bus 14. For example, the north bridge 12 receives data stored in the HDD 16 via a south bridge 15 under the control of the CPU 11, and supplies the data to a memory 18 via the PCI bus 14 and a PCI bridge 17. The north bridge 12 is also connected to a memory 13. The north bridge 12 sends and receives to and from the memory 13 data necessary for processing of the CPU 11.

The memory 13 stores data necessary for processing performed by the CPU 11. The south bridge 15 controls writing and reading of data to and from the HDD 16. The HDD 16 stores compressed encoded materials to be edited.

The PCI bridge 17 controls writing and reading of data to and from the memory 18, controls supply of compressed encoded data (that is, the materials 1 and 2) to decoders 22 to 24 or to a stream splicer 25, and controls transmission and reception of data via the PCI bus 14 and a control bus 19. Under the control of the PCI bridge 17, the memory 18 stores compressed encoded data, which is a material to be edited, read from the HDD 16 and edited compressed encoded data supplied from the stream splicer 25.

The CPU 20 controls processing performed by the PCI bridge 17, the decoders 22 to 24, the stream splicer 25, an effect/switch 26, and an encoder 27 in accordance with a command and control information supplied from the CPU 11 via the north bridge 12, the PCI bus 14, the PCI bridge 17, and the control bus 19. A memory 21 stores data necessary for processing of the CPU 20.

Under the control of the CPU 20, the decoders 22 to 24 decode supplied compressed encoded data, and outputs uncompressed image signals. A decoding range in which the decoders 22 and 23 perform decoding may be equal to a re-encoding range determined by the CPU 11 or may be a wider range including the re-encoding range. The stream splicer 25 splices supplied compressed image data in a predetermined frame under the control of the CPU 20. Each of the decoders 22 to 24 may be provided as an independent device not included in the editing apparatus 1. For example, when the decoder 24 is provided as an independent device, the decoder 24 is capable of receiving compressed edited image data generated by editing processing, decoding the compressed edited image data, and outputting the decoded image data.

As a step before an actual editing operation, in order to analyze a stream, the decoders 22 to 24 may decode the materials 1 and 2 and reports to the CPU 20 information on the amount of code stored in a buffer, according to need. The CPU 20 reports, via the control bus 19, the CPU PCI bridge 17, the PCI bus 14, and the north bridge 12, to the CPU 11 information on the amount of code stored in the buffer when decoding is performed.

The effect/switch 26 switches, under the control of the CPU 20, an uncompressed image signal output supplied from the decoder 22 or the decoder 23. That is, the effect/switch 26 splices supplied uncompressed image signals in a predetermined frame, applies an effect to a predetermined range according to need, and supplies the spliced image signal to the encoder 27. The encoder 27 encodes a portion of the supplied uncompressed image signal set as the re-encoding range, and outputs the compressed encoded image data to the stream splicer 25.

The operation of the editing apparatus 1 according to an embodiment of the present invention is described next.

Data of the VBR-compressed materials 1 and 2 is stored in the HDD 16.

The CPU 11 acquires information on the amount of generated code of the compressed encoded materials 1 and 2 selected, in accordance with a user input supplied from an operation input unit (not shown), as materials to be used for editing from among compressed encoded image materials stored in the HDD 16. The CPU 11 determines the re-encoding range, and determines the buffer occupancies at the beginning and the end of the re-encoding range.

FIG. 3 is a functional block diagram for explaining functions of the CPU 11 to determine the amount of generated code in re-encoding in an area around an editing point and to determine a re-encoding range.

A generated code amount detector 51 detects the amounts of generated code of the materials 1 and 2 stored in the HDD 16, and supplies the amounts of generated code to a buffer occupancy analyzer 52. For example, the amounts of generated code may be detected by analyzing the data of the materials 1 and 2 stored in the HDD 16 to detect the amount of code (that is, the amount of code between picture headers) or by causing the decoders 22 to 24 to decode the materials 1 and 2 to detect the amount of storage of the buffer.

The buffer occupancy analyzer 52 analyzes a model state of buffer occupancies in an area near a splice point between a range in which re-encoding is not performed and a re-encoding range in accordance with information on the amount of generated code of the material 1 or 2 supplied from the generated code amount detector 51.

Concerning the length of a re-encoding range (that is, the number of pictures of the materials 1 and 2 to be re-encoded around an editing point), a default value is determined in advance by the editing apparatus 1 irrespective of the type of material or determined in advance in accordance with an encoding method for compressed encoded data serving as a material. For example, if compressed encoded data serving as a material is encoded based on long-GOP MPEG, one GOP including an editing point is set as a default value of a re-encoding range.

Figure 4:
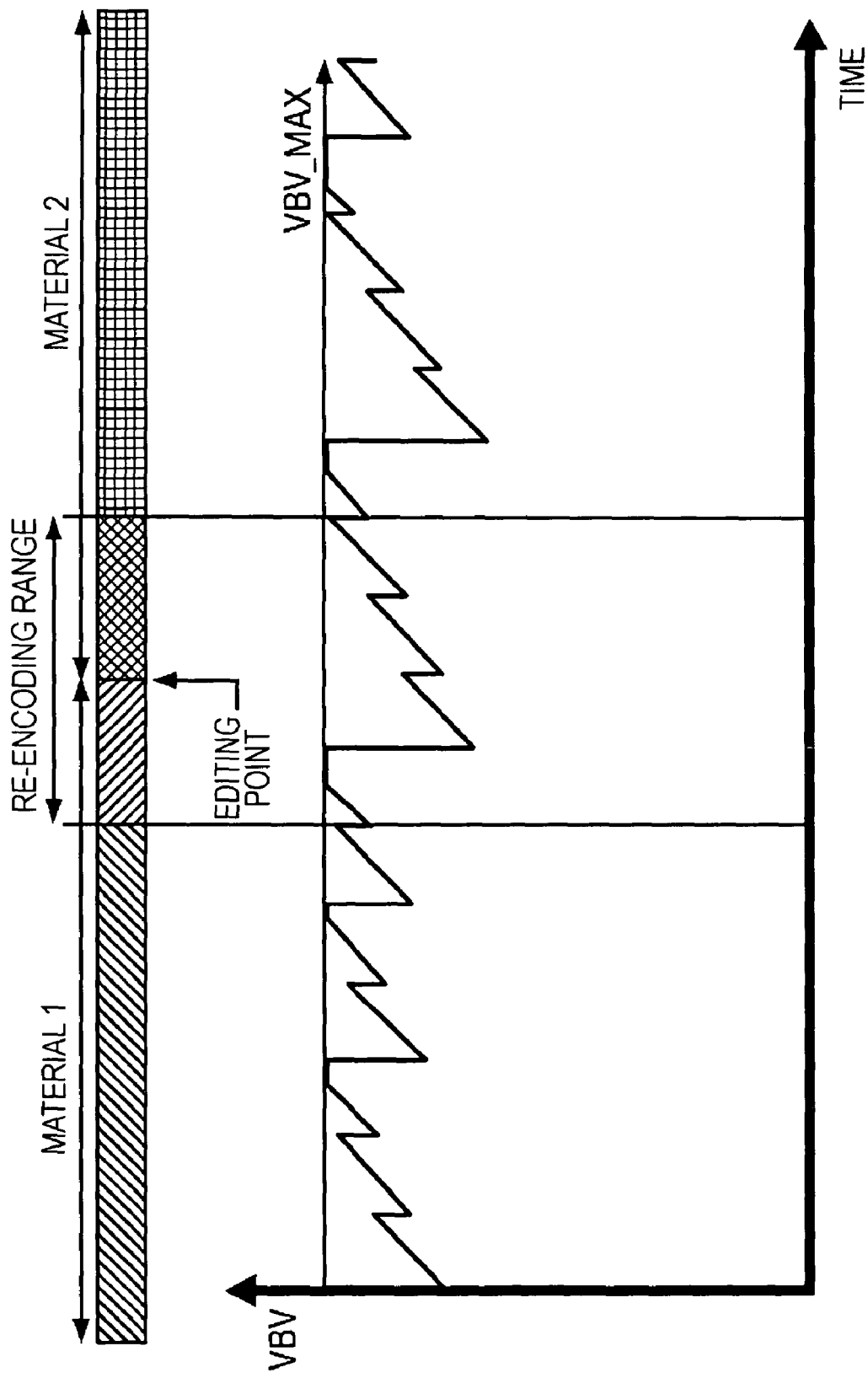
FIG. 4 is an illustration for explaining a re-encoding range and a locus of buffer occupancies.

Since, as shown in FIG. 4, in a VBR-compressed image, a buffer occupancy does not exceed the upper limit (that is, buffer occupancies stick to the upper limit VBV_MAX during a predetermined period), a buffer does not break down. However, if underflow occurs, the buffer breaks down, and the breakdown of the buffer affects an output image.

When a constant-bit-rate (CBR) encoded stream is handled, a buffer occupancy can be calculated by acquiring the position of a target picture in a buffer in accordance with values of bit_rate_value (Sequence_header), bit_rate_extension (Sequence_extension), and vbv_delay (picture_header). However, for VBR, since the value of vbv_delay, from which a buffer occupancy is calculated, is the maximum (0xFFFF), the buffer occupancy is not calculated accurately.

When an elementary stream not including playback time information is handled, if decoding is performed from an initial portion of an encoded stream, the locus of buffer occupancies intended by an encoder can be reproduced. However, generally, decoding is not always performed from an initial portion of a stream. Thus, it is necessary for an encoder to calculate the locus of virtual buffer occupancies such that an image is not lost due to underflow.

Figure 5:
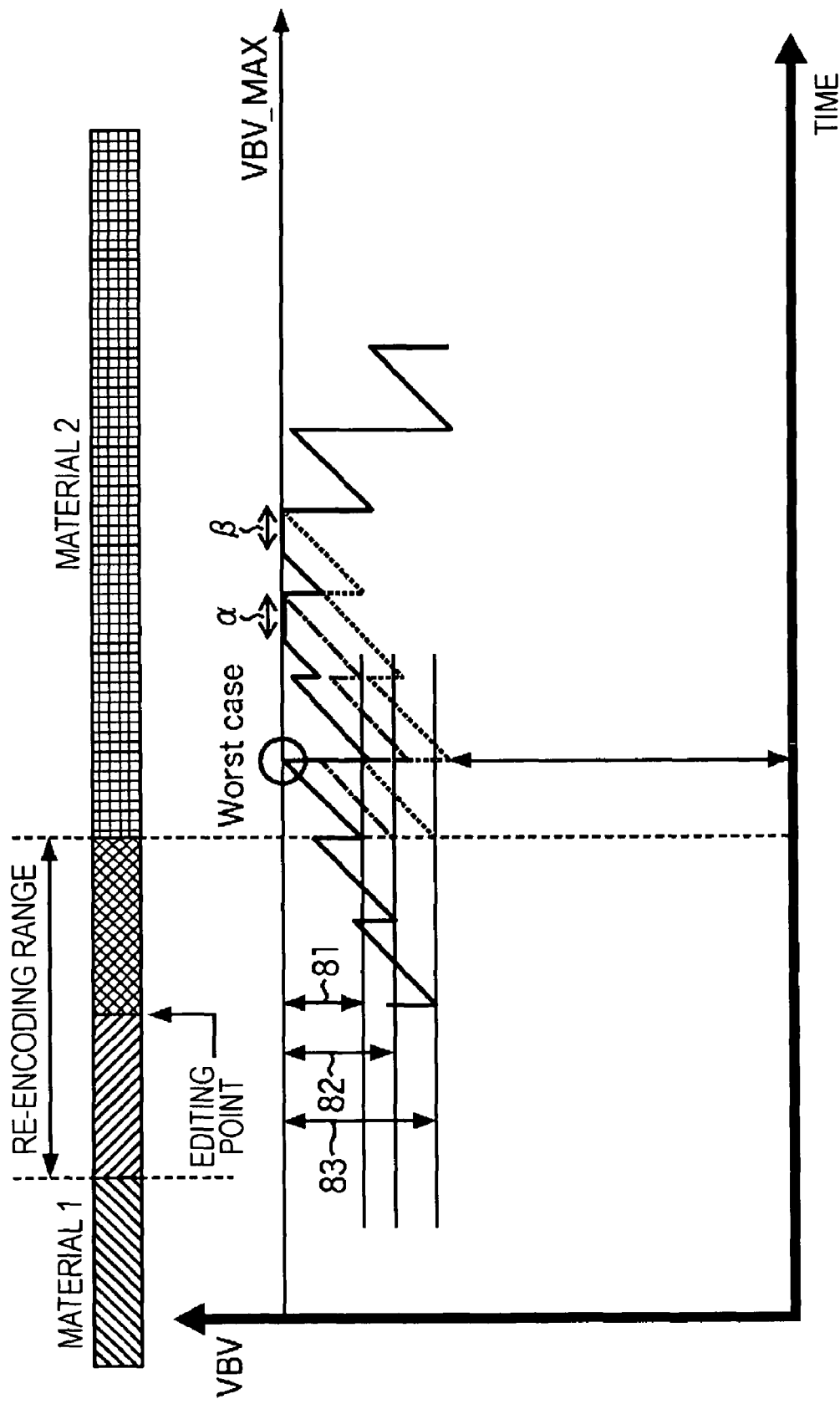
FIG. 5 is an illustration for explaining determination of the buffer occupancy at the end of a re-encoding range.

Thus, as a first model state for analyzing buffer occupancies in a portion near a splice point between a non-re-encoding range and a re-encoding range detected by the generated code amount detector 51, the buffer occupancy analyzer 52 calculates the locus of virtual buffer occupancies in a portion near a splice point between the end of the re-encoding range of the material 2 and the non-re-encoding range of the material 2 by regarding a case where the buffer occupancy of the first picture of the material 2 to be connected to the re-encoding range is the upper limit VBV_MAX, as shown in FIG. 5, as a "Worst case" in which a sufficient amount of code cannot be assigned to a portion near the end of the re-encoding range.

Figure 6:
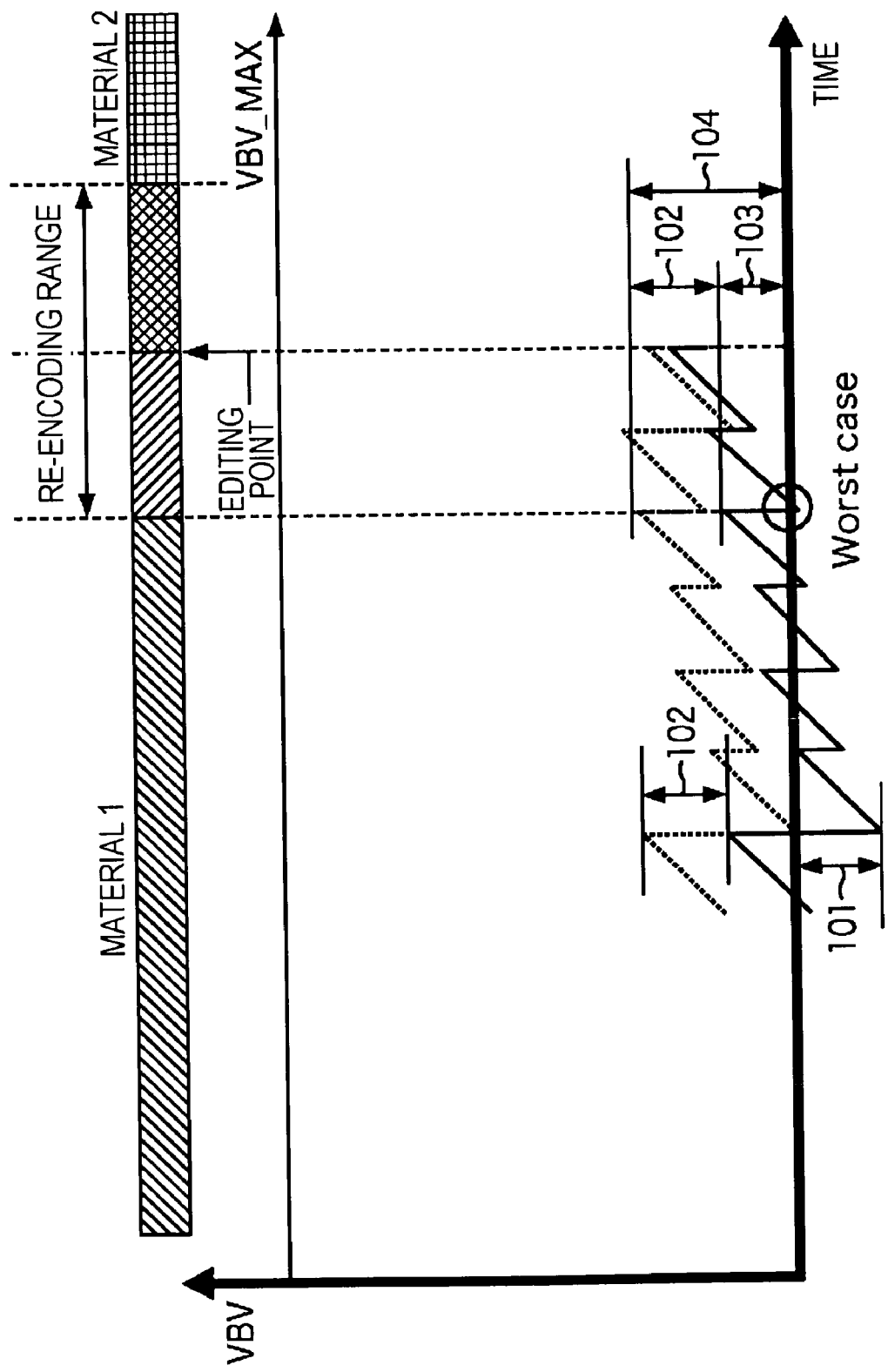
FIG. 6 is an illustration for explaining determination of the buffer occupancy at the beginning of a re-encoding range.

In addition, as a second model state for analyzing buffer occupancies in a portion near a splice point between a non-re-encoding range and a re-encoding range, the buffer occupancy analyzer 52 calculates the locus of virtual buffer occupancies in a portion near a splice point between the non-re-encoding range of the material 1 and the re-encoding range of the material 1 by regarding a case where the buffer occupancy of the splice point between the re-encoding range and the material 1 is 0, as shown in FIG. 6, as a "Worst case" in which a sufficient amount of code cannot be assigned to a portion near the start point of the re-encoding range.

The buffer occupancy analyzer 52 supplies the loci of virtual buffer occupancies calculated as the first and second models to each of a buffer occupancy determination unit 53 and a re-encoding range determination unit 54.

As a range analyzed by the buffer occupancy analyzer 52 increases, although the possibility of improved control increases, a processing time increases. For example, if a playback time is about 1 to 2 seconds or if compressed encoded data serving as a material is encoded based on long-GOP MPEG, an analysis range is about 1 to 2 GOPS. However, an analysis range can be set appropriately based on empirical or experimental data.

Since, even for VBR, an encoder performs encoding while implementing buffer management so as to conform to the standards of a VBV buffer, if the buffer occupancy of any picture in a non-re-encoding range of the material 2 subsequent to a re-encoding range is the upper limit, buffer occupancies in the subsequent pictures should not be lower than the lower limit. Thus, if buffer control for the re-encoding range is performed such that the buffer occupancy of the first frame of the material 2 connected to the re-encoding range is the upper limit, as in the "Worst case" shown in FIG. 5, editing processing can be performed without violating the standards.

However, in such a "Worst case", the buffer occupancy at the end of the re-encoding range is controlled to be within a range between the value lower than the upper limit VBV_MAX by the amount corresponding to "the maximum bit rate×1 frame time" and the upper limit VBV_MAX. Thus, strict restrictions are imposed on code distribution in the re-encoding range, and this may cause deterioration of image quality.

The buffer occupancy determination unit 53 determines whether or not a state in which buffer occupancies stick to the upper limit VBV_MAX exists, as shown by α and β in FIG. 5, in the "Worst case" in which the first picture of the material 2 connected to the re-encoding range is the upper limit VBV_MAX. If a state in which buffer occupancies stick to the upper limit VBV_MAX exists, as shown by α and β in FIG. 5, the locus of virtual buffer occupancies is downwardly modified by the amount corresponding to the ranges shown by α and β to decrease the buffer occupancy at the end of the re-encoding range, and a state in which the buffer occupancy of a picture of the non-re-encoding range of the material 2 exhibits the upper limit is acquired. Here, however, the buffer occupancy determination unit 53 downwardly modifies the locus of virtual buffer occupancies so as not to cause underflow.

More specifically, when the locus of virtual buffer occupancies is downwardly modified by the amount corresponding to "the maximum bit rate×the range represented by α", if underflow does not occur, the buffer occupancy at the end of the re-encoding range can be controlled to be within a range represented by an arrow 82, which is wider than a range represented by an arrow 81. In addition, when the locus of virtual buffer occupancies is also downwardly modified by the amount corresponding to "the maximum bit rate×the range represented by β", if underflow does not occur, the buffer occupancy at the end of the re-encoding range can be controlled to be within a range represented by an arrow 83, which is wider than the range represented by the arrow 82.

Accordingly, since the lower limit of the buffer occupancy at the end point of the re-encoding range can be reduced to be lower than that in the "Worst case" (that is, a smaller value can be set), the upper limit of the amount of code that can be distributed to the last frame in the re-encoding range can be increased. Thus, the flexibility in controlling a buffer occupancy in the re-encoding range can be increased, and distribution of code in the re-encoding range can be easily controlled. Therefore, deterioration of image quality in the re-encoding range can be prevented.

In addition, since only an amount of code less than the amount corresponding to the "the maximum bit rate×1 frame time" can be assigned to the first frame of the re-encoding range in the "Worst case" in which the buffer occupancy of the splice point between the re-encoding range and the material 1 is 0, as shown in FIG. 6, an image quality may be deteriorated.

The material 1 is a compressed image on which buffer management is performed so as to conform to the standards of a VBV buffer. Thus, when a picture in which the buffer occupancy underflows exists in the locus of virtual buffer occupancies in an analysis range of the material 1 based on the "Worst case", even if the locus of virtual buffer occupancies is upwardly modified by the amount corresponding to the underflow, control can be performed while conforming to the standards of the VBV buffer in the re-encoding range. In other words, if a picture in which the buffer occupancy underflows exists in the locus of virtual buffer occupancies in an analysis range of the material 1 based on the "Worst case", the buffer occupancy determination unit 53 upwardly modifies the locus of virtual buffer occupancies by the amount corresponding to the underflow, and determines the buffer occupancy at the beginning of the re-encoding range. Thus, the upper limit of the buffer occupancy at the start point of the re-encoding range can be increased, and the flexibility in the amount of code that can be distributed to the first frame can be increased. Therefore, deterioration of image quality can be prevented.

More specifically, if, as shown in FIG. 6, the locus of virtual buffer occupancies is upwardly modified, as shown by an arrow 102, by the amount corresponding to the largest underflow of the buffer occupancy in the analysis range of the material 1, an amount of generated code in a range represented by an arrow 104, which corresponds to a range obtained by adding "the maximum bit rate×1 frame time" represented by an arrow 103 and the amount represented by the arrow 102, unlike an amount of generated code less than a range corresponding to "the maximum bit rate×1 frame time" shown by the arrow 103, can be assigned for the buffer occupancy at the beginning of the re-encoding range. Thus, deterioration of image quality can be prevented.

In addition, as described above, if the lower limit of the buffer occupancy of the last picture in the re-encoding range is lower, the flexibility of distribution of the amount of code in the re-encoding range increases. If the upper limit of the buffer occupancy of the first picture in the re-encoding range is higher, the flexibility of distribution of the amount of code in the re-encoding range increases. Thus, deterioration of image quality in the re-encoding range can be prevented.

Figure 7:
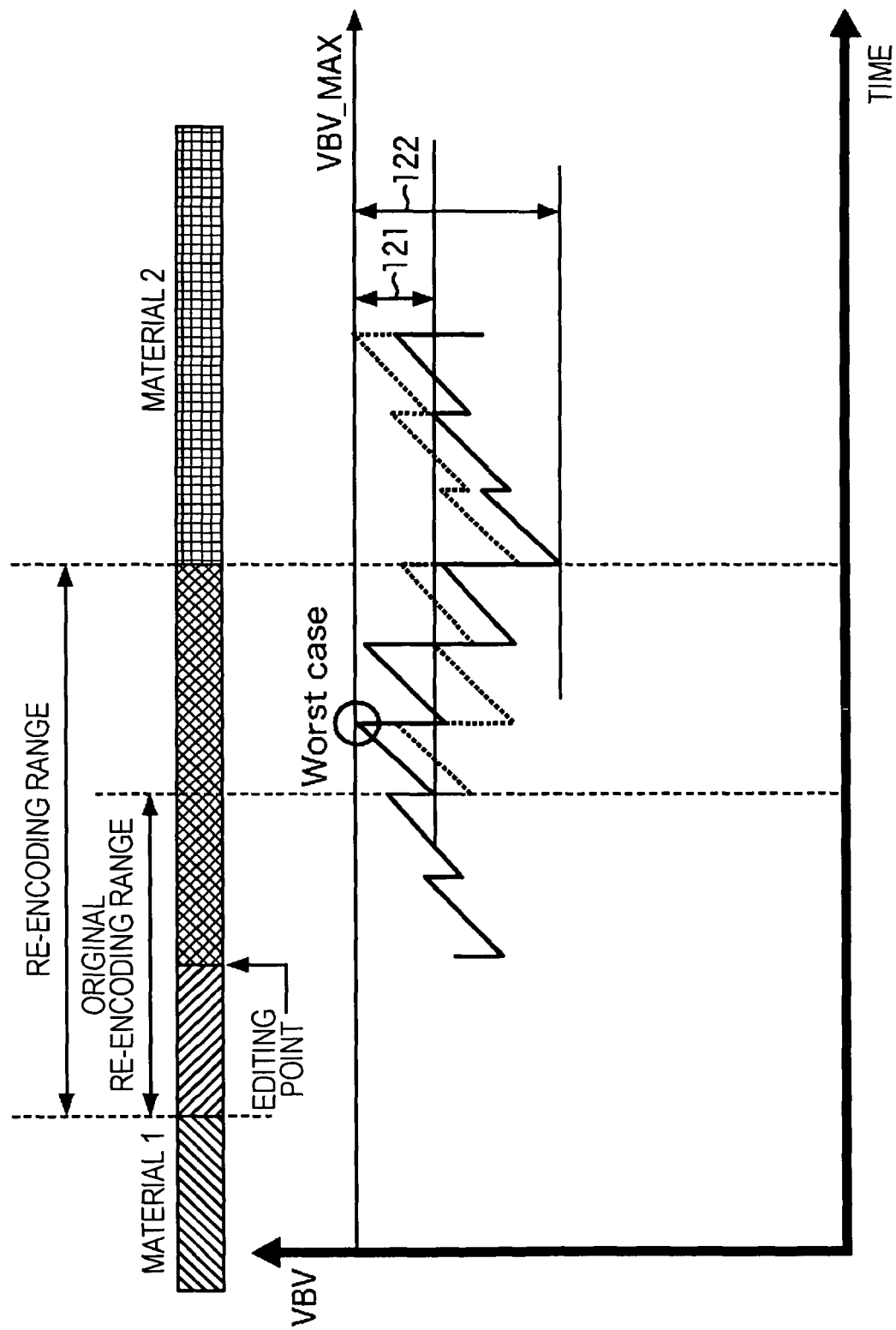
FIG. 7 is an illustration for explaining determination of the end point of a re-encoding range.

The re-encoding range determination unit 54 detects a point at which the buffer occupancy is the lowest in the analysis range of the material 2 in the "Worst case" in which the buffer occupancy of the first picture of the re-encoding range of the material 2 that is spliced to the re-encoding range is the upper limit VBV_MAX, as shown in FIG. 7, and changes the end point of the re-encoding range to the detected point at which the buffer occupancy is the lowest.

More specifically, in the "Worst case", as shown in FIG. 7, in the original re-encoding range, the buffer occupancy at the splice point between the original re-encoding range and the non-re-encoding range is controlled to be within a range represented by an arrow 121. However, the buffer occupancy at the splice point between the new re-encoding range changed by the re-encoding range determination unit 54 and the non-re-encoding range can be controlled to be within a range represented by an arrow 122. Thus, the flexibility in distribution of code in the re-encoding range can be increased, and deterioration of image quality can be prevented.

Figure 8:
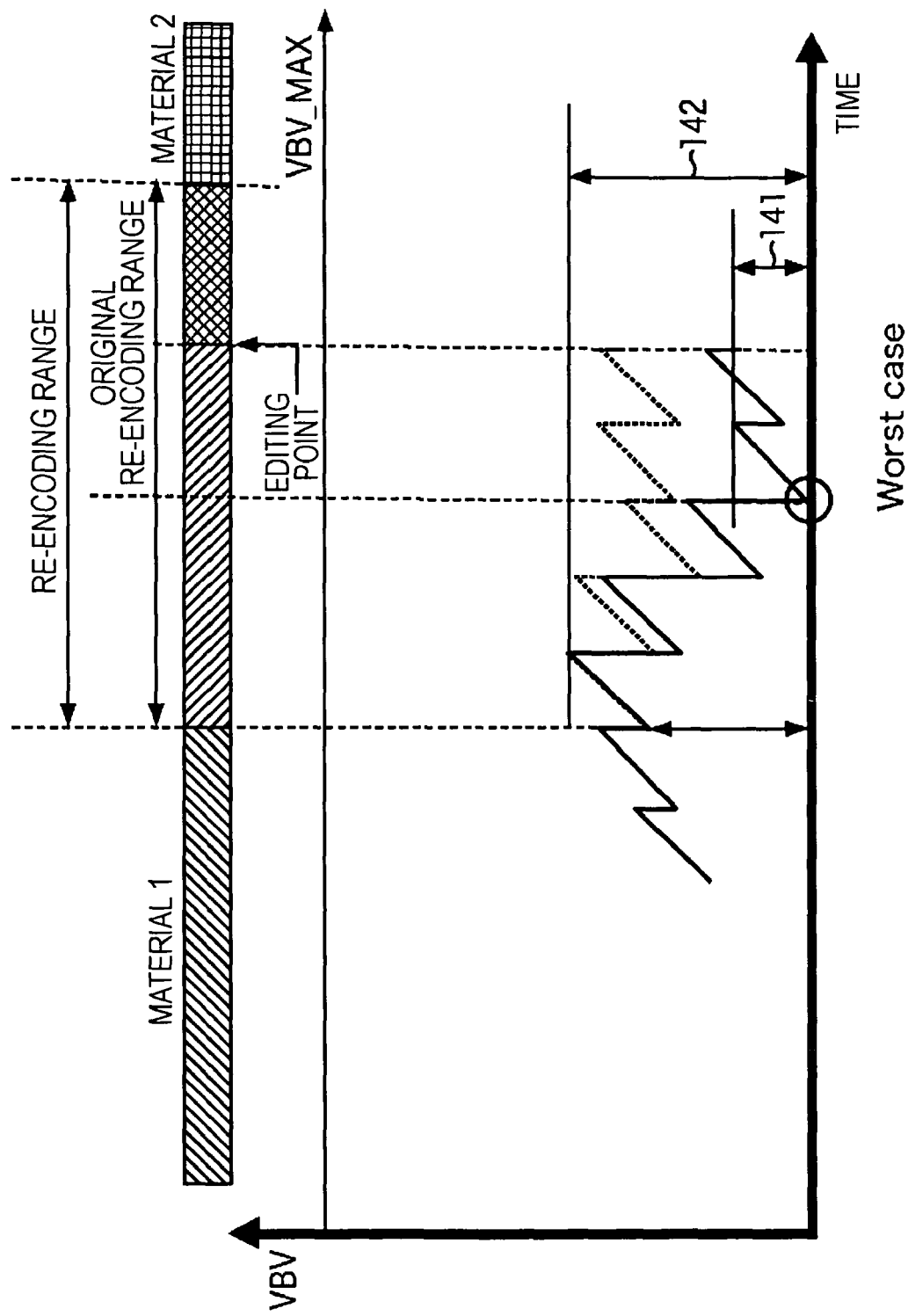
FIG. 8 is an illustration for explaining determination of the start point of a re-encoding range.

Similarly, the re-encoding range determination unit 54 detects a point at which the buffer occupancy is the highest in the analysis range of the material 1 in the "Worst case" in which the buffer occupancy at the splice point between the re-encoding range and the non-re-encoding range of the material 1 is 0, as shown in FIG. 8, and changes the start point of the re-encoding range to the detected point at which the buffer occupancy is the highest.

More specifically, in the "Worst case", as shown in FIG. 8, in the original re-encoding range, the buffer occupancy of the picture next to the splice point between the original re-encoding range and the non-re-encoding range is controlled to be within a range represented by an arrow 141. However, the buffer occupancy at the splice point between the new re-encoding range changed by the re-encoding range determination unit 54 and the non-re-encoding range can be controlled to be within a range represented by an arrow 142.

Thus, the flexibility in distribution of code in the re-encoding range can be increased, and deterioration of image quality can be prevented.

In addition, only one of the processing of the buffer occupancy determination unit 53 and the processing of the re-encoding range determination unit 54 may be performed. Alternatively, both the processing of the buffer occupancy determination unit 53 and the processing of the re-encoding range determination unit 54 can be combined and performed together. In other words, in accordance with virtual loci of buffer occupancies in the "Worst cases" in predetermined ranges previous and subsequent to splice points between non-re-encoding ranges and a re-encoding range analyzed by the buffer occupancy analyzer 52, the buffer occupancy determination unit 53 performs processing for changing the loci of virtual buffer occupancies, as described with reference to FIGS. 5 and 6, and supplies to the re-encoding range determination unit 54 the changed loci of virtual buffer occupancies. Then, the re-encoding range determination unit 54 performs processing for changing a re-encoding range in accordance with the changed loci of virtual buffer occupancies, as described with reference to FIGS. 7 and 8, and supplies to the buffer occupancy determination unit 53 the changed re-encoding range. The buffer occupancy determination unit 53 calculates the buffer occupancies at the beginning and the end of the new re-encoding range.

A command and control information generator 55 acquires the buffer occupancies at the beginning and the end of the re-encoding range determined by the buffer occupancy determination unit 53 and the re-encoding range determined by the re-encoding range determination unit 54, and generates such information, information on an editing point designated by the user, and an editing start command.

The CPU 11 controls the south bridge 15 to read compressed encoded data of the materials 1 and 2 from the HDD 16 in accordance with an operation input by the user and supplied from an operation input unit (not shown), and to supply to the memory 18 via the north bridge 12, the PCI bus 14, and the PCI bridge 17 to be stored in the memory 18. In addition, the CPU 11 supplies to the CPU 20 via the north bridge 12, the PCI bus 14, the PCI bridge 17, and the control bus 19 information on the editing point, the re-encoding range, and the buffer occupancies at the start point and the end point of the re-encoding range and a command for starting editing generated by the command and control information generator 55.

The CPU 20 controls the PCI bridge 17 to supply to the decoder 22 data of a picture in a decoding range determined in accordance with a re-encoding range set by the CPU 11 from among compressed encoded data of the material 1 stored in the memory 18 and to supply to the decoder 23 data of a picture of the material 2 in a decoding range determined in accordance with the re-encoding range. The decoding range may be equal to the re-encoding range or may be a wider range including the re-encoding range. In addition, for example, if a picture to which a picture in the encoding range refers exists when data of the materials 1 and 2 is MPEG interframe reference coding data or the like, a corresponding reference picture is also supplied to the decoder 23, according to need.

At this time, the CPU 20 controls the PCI bridge 17 to supply to the stream splicer 25 a picture in non-re-encoding ranges of the compressed encoded data of the materials 1 and 2 stored in the memory 18.

The CPU 20 controls the decoders 22 and 23 to decode supplied compressed encoded data.

Under the control of the CPU 20, the decoders 22 and 23 decode supplied data, and supply to the effect/switch 26 signals of the material images 1 and 2 obtained by decoding. Under the control of the CPU 20, the effect/switch 26 splices uncompressed decoded material images 1 and 2 at a predetermined cut-editing (splice) point, applies an effect according to need, and generates an uncompressed edited image signal for re-encoding. If a re-encoding reference image necessary for re-encoding exists, the effect/switch 26 supplies to the encoder 27 reference image data for the re-encoding reference image and the uncompressed edited image signal.

The decoders 22 and 23 are capable of extracting information necessary for encoding processing performed by the encoder 27 and supplying the information to the CPU 20 via the control bus 19. The CPU 20 supplies to the encoder 27 via the 19 the information that is necessary for the encoding processing performed by the encoder 27 and that is supplied from the decoder 22 or 23.

The encoder 27 encodes, under the control of the CPU 20, the uncompressed edited image signal for re-encoding supplied from the effect/switch 26.

When the encoder 27 encodes the uncompressed edited image signal for re-encoding, the CPU 20 performs buffer control so as to conform to the standards of the VBV buffer in accordance with information indicating the buffer occupancies at the start point and the end point of the re-encoding range set by the CPU 11.

Then, the image data re-encoded by the encoder 27 is supplied to the stream splicer 25. Then, the stream splicer 25 splices, under the control of the CPU 20, data of the materials 1 and 2 in the non-re-encoding ranges supplied from the PCI bridge 17 and the encoded image data supplied from the encoder 27, and generates compressed edited image data.

More specifically, the stream splicer 25 splices, under the control of the CPU 20, streams such that the material 1 supplied from the PCI bridge 17 and the encoded image data supplied from the encoder 27 are connected so as to be consecutive in the displayed order and that the encoded image data supplied from the encoder 27 and the material 2 supplied from the PCI bridge 17 are connected so as to be consecutive in the displayed order.

Then, under the control of the CPU 20, the stream splicer 25 supplies the created compressed edited image data to the PCI bridge 17 to be stored in the memory 18, and supplies the compressed edited image data to the decoder 24 to be decoded. The data decoded by the decoder 24 is output and displayed on a monitor for checking an editing result, and a baseband signal generated by decoding is output to another apparatus.

If an instruction to store compressed edited image data is issued from an operation input unit (not shown), the CPU 11 controls the PCI bridge 17 to read the compressed edited image data stored in the memory 18 and to supply the read data to the south bridge 15 via the PCI bus 14 and the north bridge 12, and controls the south bridge 15 to supply the compressed edited image data to the HDD 16 to be stored in the HDD 16.

An editing process performed by the editing apparatus 1 is described next with reference to FIG. 9.

In step S1, the CPU 11 receives an operation input from a user using an operation input unit (not shown) for instructing to start editing.

Figure 10:
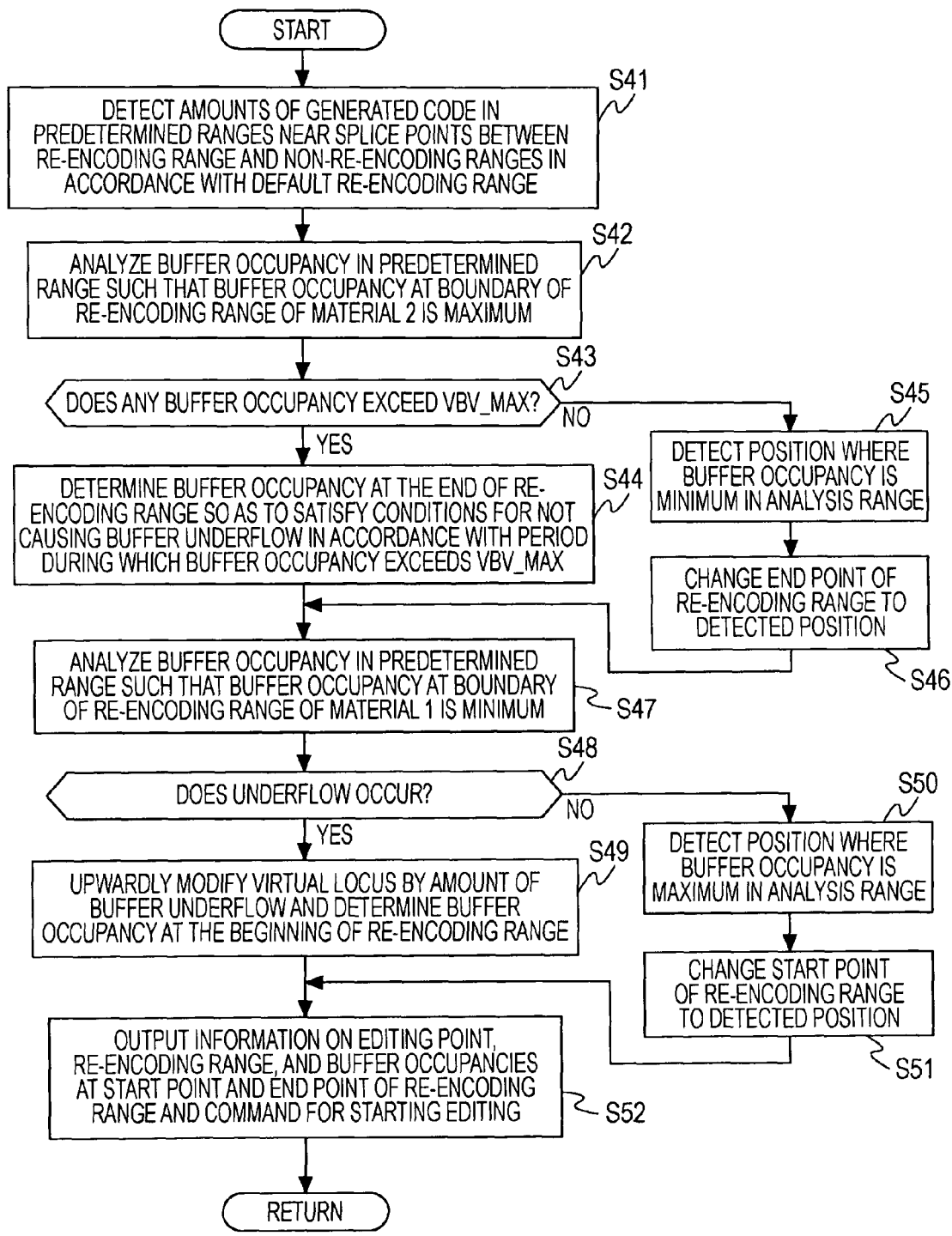
FIG. 10 is a flowchart of a first example of a re-encoding range and buffer occupancy determination process.
Figure 11:
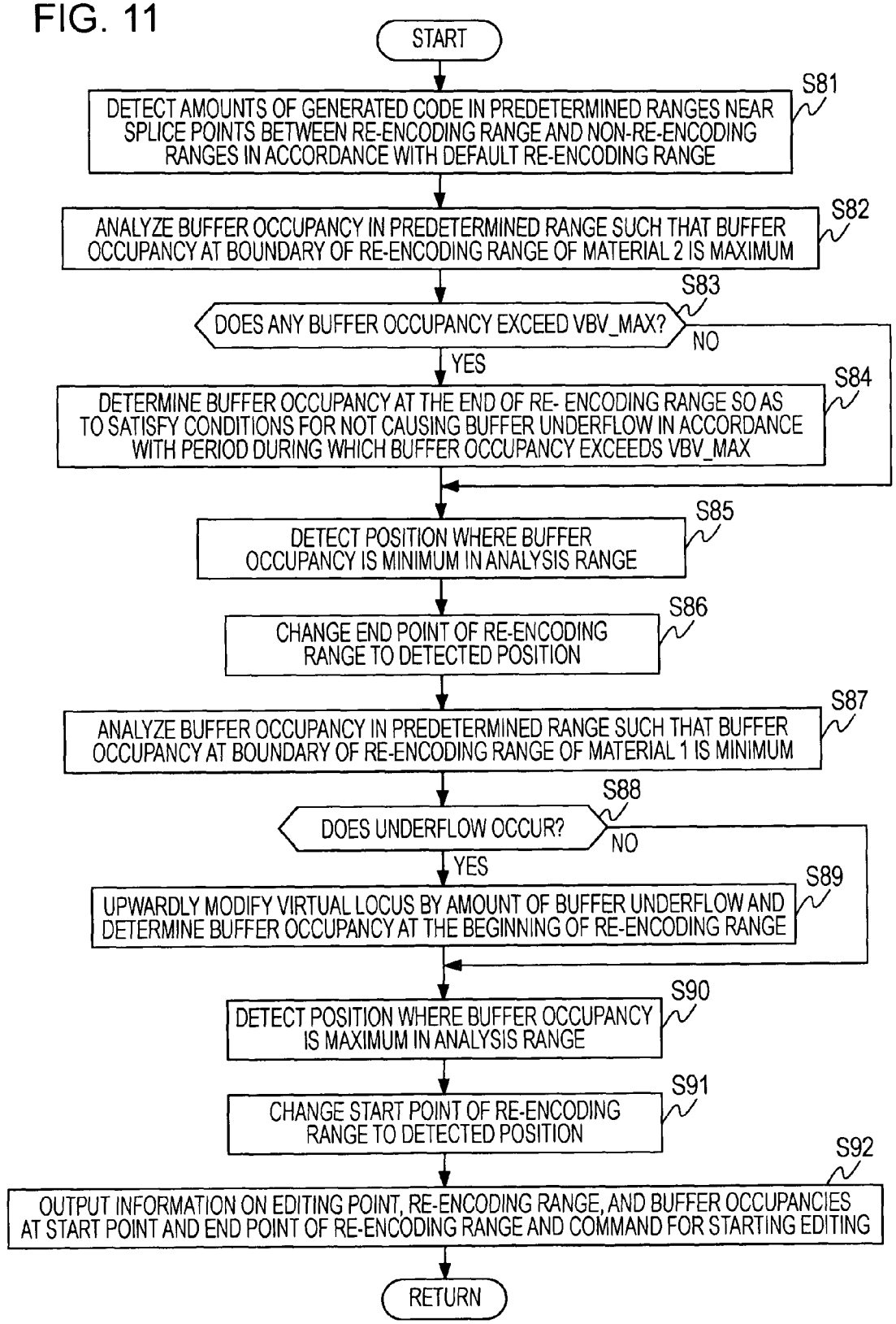
FIG. 11 is a flowchart of a second example of the re-encoding range and buffer occupancy determination process.

In step S2, a process for determining a re-encoding range and buffer occupancies, which will be described later with reference to FIG. 10 or 11, is performed.

In step S3, in accordance with the operation input from the user and supplied from the operation input unit (not shown), the CPU 11 controls the south bridge 15 to read compressed encoded data of the materials 1 and 2, to supply the read data to the memory 18 via the north bridge 12, the PCI bus 14, and the PCI bridge 17, and to store the read data into the memory 18. In addition, the CPU 11 supplies information indicating an editing point, a re-encoding range, and buffer occupancies at the start point and the end point of the re-encoding range and a command for starting editing to the CPU 20 via the north bridge 12, the PCI bus 14, the PCI bridge 17, and the control bus 19. The memory 18 acquires two pieces of compressed encoded editing material data to be edited.

In step S4, the CPU 20 controls the PCI bridge 17 to determine a decoding range for the two pieces of compressed encoded editing material data stored in the memory 18 in accordance with the determined re-encoding range, to extract data in the decoding range and data necessary for decoding and re-encoding the data in the decoding range according need, and to supply the extracted data to the decoders 22 and 23. The decoding range may be equal to the re-encoding range or may be a wider range including the re-encoding range.

At this time, the CPU 20 controls the PCI bridge 17 to supply to the stream splicer 25 compressed encoded editing material data in non-encoding ranges. Under the control of the CPU 20, the PCI bridge 17 extracts, from among compressed encoded two pieces of editing material data stored in the memory 18, data in the determined decoding range and data necessary for decoding and re-encoding the data in the decoding range, according to need, supplies the extracted data to the decoders 22 and 23, and supplies compressed encoded editing material data in the non-re-encoding ranges to the stream splicer 25.

In addition, according to need, the CPU 20 is capable of acquiring, for example, information on the type of effect to be applied to an image in the re-encoding range and information on the difficulty in encoding of a picture included in re-encoding.

In step S5, the CPU 20 controls the decoders 22 and 23 to decode data in the determined decoding range. Under the control of the CPU 20, the decoders 22 and 23 decode supplied compressed encoded editing material data, and supply the decoded data to the effect/switch 26.

In step S6, the CPU 20 controls the effect/switch 26 to splice the decoded data at an editing point and to apply an effect according to need. Under the control of the CPU 20, the effect/switch 26 splices supplied uncompressed decoded image materials at an editing point, applies an effect according to need, and supplies the spliced material to the encoder 27.

In step S7, the CPU 20 supplies to the encoder 27 information on the buffer occupancies at the start point and the end point of the re-encoding range, and controls the encoder 27 to re-encode image data in the re-encoding range from among the image data decoded and spliced at the editing point. Under the control of the CPU 20, the encoder 27 re-encodes the image data in the re-encoding range from among the image data decoded and spliced at the editing point so as to conform to the standards of the VBV buffer in accordance with the information on the buffer occupancies at the start point and the end point of the re-encoding range, and supplies to the stream splicer 25 the re-encoded image data.

In step S8, the stream splicer 25 splices the encoded portion and the compressed image data in the non-re-encoded portions, and the process ends.

As described above, portions near an editing point of two image materials (compressed image data) are decoded, and decoded uncompressed image signals are connected together at a predetermined editing point. Then, the connected image signal is re-encoded, and connected to compressed image data in a range in which decoding and re-encoding is not performed. Thus, editing of compressed image data can be achieved.

In addition, the encoder 27 re-encodes an editing image in a re-encoding range set by the CPU 11 so as to conform to the standards of the VBV buffer in accordance with information on the buffer occupancies at the start point and the end point of the re-encoding range set by the CPU 11. Thus, the flexibility in assigning of the amount of generated code is increased compared with a known case, and deterioration of image quality can be prevented.

Figure 9:
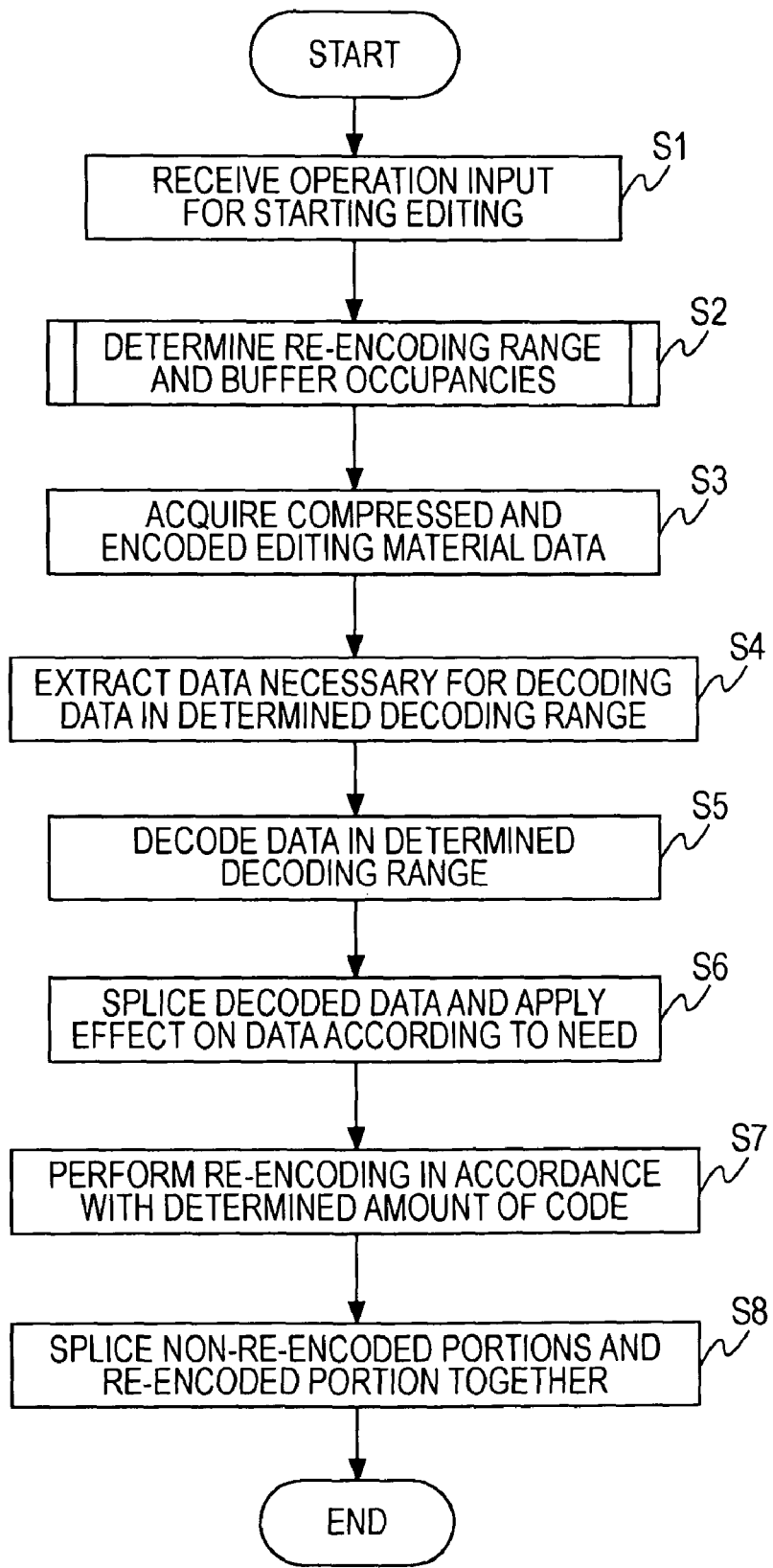
FIG. 9 is a flowchart for explaining editing processing.

A first example of a re-encoding range and buffer occupancy determination process performed in the processing of step S2 in FIG. 9 is described next with reference to the flowchart shown in FIG. 10.

In step S41, the generated code amount detector 51 detects, in accordance with a default re-encoding range set in advance, the amounts of generated code of the materials 1 and 2 in predetermined ranges near splice points between a re-encoding range and non-re-encoding ranges, and supplies the amounts of generated code to the buffer occupancy analyzer 52.

In step S42, the buffer occupancy analyzer 52 analyzes a buffer occupancy in a predetermined range in the "Worst case" in which the buffer occupancy of the picture next to the boundary of the re-encoding range of the material 2 is the upper limit, acquires the locus of virtual buffer occupancies in the "Worst case", and supplies the locus of virtual buffer occupancies to the buffer occupancy determination unit 53 and the re-encoding range determination unit 54.

In step S43, the buffer occupancy determination unit 53 determines whether or not a portion in which a buffer occupancy exceeds the upper limit VBV_MAX exists in the analyzed locus of virtual buffer occupancies in the "Worst case".

If it is determined in step S43 that a portion in which a buffer occupancy exceeds the upper limit VBV_MAX exists, the buffer occupancy determination unit 53 determines the buffer occupancy at the end of the re-encoding range so as to satisfy the conditions for not causing buffer underflow in accordance with a period during which the buffer occupancy exceeds the upper limit VBV_MAX (for example, $\alpha$ and $\beta$ shown in FIG. 5) in step S44. Then, the process proceeds to step S47.

If it is determined in step S43 that a portion in which a buffer occupancy exceeds the upper limit VBV_MAX does not exist, the re-encoding range determination unit 54 detects a position at which the buffer occupancy is the lowest in an area corresponding to the non-re-encoding range of the material 2 within the analysis range, as described with reference to FIG. 7, in step S45.

In step S46, the re-encoding range determination unit 54 changes the end point of the re-encoding range to the detected position, as described with reference to FIG. 7. The re-encoding range determination unit 54 reports to the buffer occupancy determination unit 53 the end point of the newly set re-encoding range, and the buffer occupancy determination unit 53 acquires the buffer occupancy at the end point of the newly set re-encoding range.

After the processing in step S44 or S46, the buffer occupancy analyzer 52 analyzes a buffer occupancy in a predetermined range in the "Worst case" in which the buffer occupancy at the boundary of the re-encoding range of the material 1 is the lower limit, as described with reference to FIG. 6, acquires the locus of virtual buffer occupancies in the "Worst case", and supplies the locus of virtual buffer occupancies to the buffer occupancy determination unit 53 and the re-encoding range determination unit 54 in step S47.

In step S48, the buffer occupancy determination unit 53 determines whether or not underflow occurs in the analyzed locus of virtual buffer occupancies in the "Worst case".

If it is determined in step S48 that underflow occurs, the buffer occupancy determination unit 53 upwardly modifies the virtual locus by the amount corresponding to the buffer underflow, as described with reference to FIG. 6, and determines the buffer occupancy at the beginning of the re-encoding range in step S49. Then, the process proceeds to step S52.

If it is determined in step S48 that underflow does not occur, the re-encoding range determination unit 54 detects a position at which the buffer occupancy is the highest in the non-re-encoding range of the material 1 in the analysis range, as described with reference to FIG. 8, in step S50.

Then, in step S51, the re-encoding range determination unit 54 changes the start point of the re-encoding range to the detected position, as described with reference to FIG. 8. The re-encoding range determination unit 54 reports to the buffer occupancy determination unit 53 the start point of the newly set re-encoding range, and the buffer occupancy determination unit 53 acquires the buffer occupancy at the start point of the newly set re-encoding range.

After the processing of step S49 or S51, the command and control information generator 55 generates and outputs information on the editing point, the re-encoding range, and the buffer occupancies at the start point and the end point of the re-encoding range and a command for starting editing in step S52. Then, the process returns to step S2 in FIG. 9, and proceeds to step S3.

As described above, when a VBR-compressed image is edited, a re-encoding range and buffer occupancies at the start point and the end point of the re-encoding range can be determined such that buffer control for the re-encoding range can be easily performed and an image quality can be improved without analyzing all the material data.

A second example of the re-encoding range and buffer occupancy determination process performed in the processing of step S2 in FIG. 9 is described next with reference to the flowchart shown in FIG. 11.

In steps S81 to S83, processing basically similar to that in steps S41 to S43 shown in FIG. 10 is performed.

In other words, the generated code amount detector 51 detects, in accordance with a default re-encoding range set in advance, the amounts of generated code of the materials 1 and 2 in predetermined ranges near splice points between the re-encoding range and the non-re-encoding ranges, and supplies the amounts of generated code to the buffer occupancy analyzer 52. The buffer occupancy analyzer 52 analyzes a buffer occupancy in a predetermined range in the "Worst case" in which the buffer occupancy of the picture next to the boundary of the re-encoding range of the material 2 is the upper limit, as described with reference to FIG. 5, acquires the locus of virtual buffer occupancies in the "Worst case", and supplies the locus of virtual buffer occupancies to the buffer occupancy determination unit 53 and the re-encoding range determination unit 54. The buffer occupancy determination unit 53 determines whether or not a portion in which a buffer occupancy exceeds the upper limit VBV_MAX exists in the analyzed locus of virtual buffer occupancies in the "Worst case".

If it is determined in step S83 that a portion in which a buffer occupancy exceeds the upper limit VBV_MAX exists, the buffer occupancy determination unit 53 determines the buffer occupancy at the end of the re-encoding range so as to satisfy the conditions for not causing buffer underflow in accordance with a period during which the buffer occupancy exceeds the upper limit VBV_MAX (for example, α and β shown in FIG. 5), and supplies the modified locus of virtual buffer occupancies to the re-encoding range determination unit 54 in step S84.

When it is determined in step S83 that a portion in which a buffer occupancy exceeds the upper limit VBV_MAX does not exist or after the processing of step S84 is performed, the re-encoding range determination unit 54 detects a position at which the buffer occupancy is the lowest in the analysis range, as described with reference to FIG. 7, in step S85. If the buffer occupancy at the end of the re-encoding range is changed in step S84, a position at which the buffer occupancy is the lowest is detected in step S85 in accordance with the locus based on changed virtual buffer occupancies.

In step S86, the re-encoding range determination unit 54 changes the end point of the re-encoding range to the detected position, as described with reference to FIG. 7. The re-encoding range determination unit 54 reports to the buffer occupancy determination unit 53 the end point of the newly set re-encoding range, and the buffer occupancy determination unit 53 acquires the buffer occupancy at the end point of the newly set re-encoding range.

In steps S87 and S88, processing basically similar to that in steps S47 and S48 shown in FIG. 10 is performed.

In other words, the buffer occupancy analyzer 52 analyzes a buffer occupancy in a predetermined range in the "Worst case" in which the buffer occupancy at the boundary of the re-encoding range of the material 1 is the lower limit, as described with reference to FIG. 6, acquires the locus of virtual buffer occupancies in the "Worst case", and supplies the locus of virtual buffer occupancies to the buffer occupancy determination unit 53 and the re-encoding range determination unit 54. The buffer occupancy determination unit 53 determines whether or not underflow occurs in the analyzed locus of virtual buffer occupancies in the "Worst case".

If it is determined in step S88 that underflow occurs, the buffer occupancy determination unit 53 upwardly modifies the virtual locus by the amount corresponding to the buffer underflow, as described with reference to FIG. 6, determines the buffer occupancy at the beginning of the re-encoding range, and supplies the modified locus of virtual buffer occupancies to the re-encoding range determination unit 54 in step S89.

When it is determined in step S88 that underflow does not occur or after the processing of step S89 is performed, the re-encoding range determination unit 54 detects a position at which the buffer occupancy is the highest in the analysis range, as described with reference to FIG. 8, in step S90. If the buffer occupancy at the beginning of the re-encoding range is changed in step S89, a position at which the buffer occupancy is the highest is detected in step S90 in accordance with the locus based on changed virtual buffer occupancies.

In step S91, the re-encoding range determination unit 54 changes the start point of the re-encoding range to the detected position, as described with reference to FIG. 8. The re-encoding range determination unit 54 reports to the buffer occupancy determination unit 53 the start point of the newly set re-encoding range, and the buffer occupancy determination unit 53 acquires the buffer occupancy at the start point of the newly set re-encoding range.

In step S92, the command and control information generator 55 generates and outputs information on the editing point, the re-encoding range, and the buffer occupancies at the start point and the end point of the re-encoding range and a command for starting editing. Then, the process returns to step S2 in FIG. 9, and proceeds to step S3.

As described above, when a VBR-compressed image is edited, a re-encoding range and buffer occupancies at the start point and the end point of the re-encoding range can be determined such that buffer control for the re-encoding range can be easily performed and an image quality can be improved without analyzing all the material data.

According to the above-described processing, a VBR-compressed image can be edited by decoding and re-encoding only a portion near an editing point.

In addition, when a VBR-compressed image is edited, a transition state of buffer occupancies of a virtual buffer near a splice point between a re-encoding range and a non-re-encoding range is examined, and the amount of code to be assigned to a picture in the re-encoding range can be increased. Thus, control can be performed easily, and deterioration of image quality can be prevented. Therefore, an edited image with high quality can be acquired.

The foregoing series of processing may also be performed by software. If the foregoing series of processing is performed by software, a program constituting the software is installed from a recording medium into a computer installed in dedicated hardware or, for example, a general-purpose personal computer capable of performing various functions by installing various programs. In this case, for example, the editing apparatus 1 described with reference to FIG. 2 is a personal computer 401 shown in FIG. 12.

Referring to FIG. 12, a CPU 411 performs various types of processing in accordance with a program stored in a read-only memory (ROM) 412 or a program loaded from a storage unit 418 to a random-access memory (RAM) 413. Data necessary for the CPU 411 to perform various types of processing is appropriately stored in the RAM 413.

The CPU 411, the ROM 412, and the RAM 413 are connected to each other via a bus 414. An input/output interface 415 is also connected to the bus 414.

An input unit 416 including a keyboard, a mouse, and the like, an output unit 417 including a display and a speaker, the storage unit 418 including a hard disk and the like, and a communication unit 419 including a modem, a terminal adapter, and the like are connected to the input/output interface 415. The communication unit 419 performs communication processing via a network, such as the Internet.

A drive 420 is connected to the input/output interface 415, according to need. A magnetic disc 431, an optical disc 432, a magnetic optical disc 433, a semiconductor memory 434, or the like is appropriately installed in the drive 420. A computer program read from the magnetic disc 431, the optical disc 432, the magnetic optical disc 433, the semiconductor memory 434, or the like is installed in the storage unit 418 according to need.

When the series of foregoing processing is performed by software, a program constituting the software is installed from a network or a recording medium into a computer installed in dedicated hardware or, for example, a general-purpose personal computer that is capable of performing various functions by installing various programs.

The recording medium not only includes a package medium, such as the magnetic disc 431 (including a flexible disc), the optical disc 432 (including a compact disk-read only memory (CD-ROM) and a digital versatile disc (DVD)), the magnetic optical disc 433 (including a Mini-Disk (MD) (registered trademark)), or the semiconductor memory 434, which records the program and is distributed in order to provide the program to a user independent of the computer, but also includes the ROM 412 and the hard disk included in the storage unit 418 which record the program and are built in the computer to be provided to the user.

In this specification, steps defining a program recorded in the recording medium are not necessarily performed in chronological order in accordance with the written order. The steps may be performed in parallel or independently without being performed in chronological order.

Figure 13A:
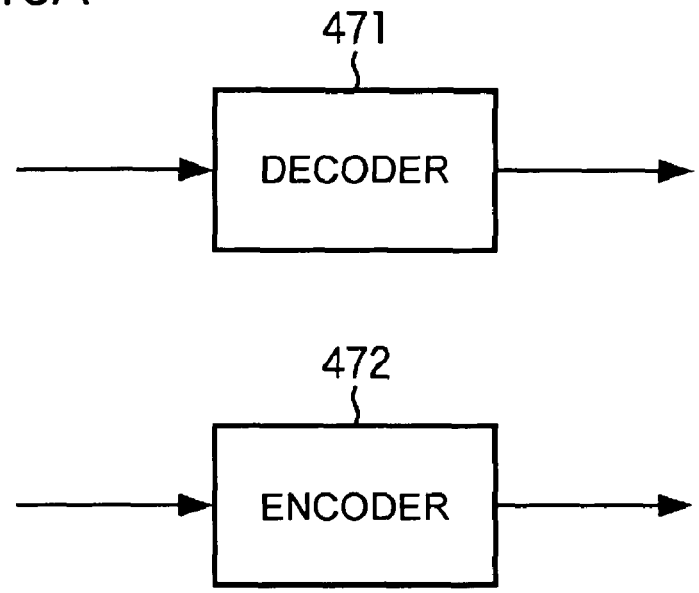
FIGS. 13A and 13B are illustrations for explaining configurations of different apparatuses according to modifications of the present invention.

Although the editing apparatus 1 includes a decoder and an encoder in the foregoing embodiment, each of the decoder and the encoder may be provided as an independent device. For example, as shown in FIG. 13A, each of a decoder 471 that decodes stream data into a baseband signal and an encoder 472 that encodes a baseband signal into stream data may be provided as an independent device.

In this case, decoder 471 is capable not only of decoding compressed encoded data, which is an image material, and supplying the decoded data to the encoder 472, but also of receiving compressed encoded data that is edited and generated after being partially encoded by the encoder 472 and decoding the received compressed encoded data into a baseband signal. The edited stream converted into the baseband signal is, for example, supplied to a predetermined display device to be displayed or output to another device to be subjected to necessary processing.

In addition, in the foregoing embodiment, the decoders 22 to 24 may not completely decode supplied compressed encoded data, and the corresponding encoder 27 may partially encode a portion corresponding to incompletely decoded data.

For example, when the decoders 22 to 24 perform decoding and dequantization for variable length code (VLC) but do not perform inverse discrete cosine transform (DCT), the encoder 27 performs quantization and variable length coding but does not perform DCT transform. Obviously, such an encoder that performs partial encoding (encoding from the middle stage) can be used in the present invention.

In addition, in the foregoing embodiment, a baseband signal completely decoded by the decoders 22 to 24 may be partially encoded to the middle stage by the encoder 27 (for example, the encoder 27 performs DCT transform and quantization but does not perform variable length coding) or data encoded to the middle stage due to incomplete decoding by the decoders 22 to 24 (for example, the decoders 22 to 24 perform decoding and dequantization for VLC code but do not perform inverse DCT transform) may be further encoded to the middle stage by the encoder 27 (for example, the encoder 27 performs quantization but does not perform variable length coding).

In addition, the decoder 471 shown in FIG. 13A may not completely decode supplied stream data, and the corresponding encoder 472 shown in FIG. 13A may partially encode a portion corresponding to incompletely decoded data.

For example, when the decoder 471 performs decoding and dequantization for VLC code but does not perform inverse DCT transform, the encoder 472 performs quantization and variable length coding but does not perform DCT transform. Obviously, decoding processing performed by the decoder 471 that performs partial decoding (decoding to the middle stage) and encoding processing performed by the encoder 472 that performs partial encoding (encoding from the middle stage) can be adopted in the present invention.

In addition, a baseband signal completely decoded by the decoder 471 may be partially encoded to the middle stage by the encoder 472 (for example, the encoder 472 performs DCT transform and quantization but does not perform variable length coding) or data encoded to the middle stage due to incomplete decoding by the decoder 471 (for example, the decoder 471 performs decoding and dequantization for VLC code but does not perform inverse DCT transform) may be further encoded to the middle stage by the encoder 472 (for example, the encoder 472 performs quantization but does not perform variable length coding).

Figure 13B:
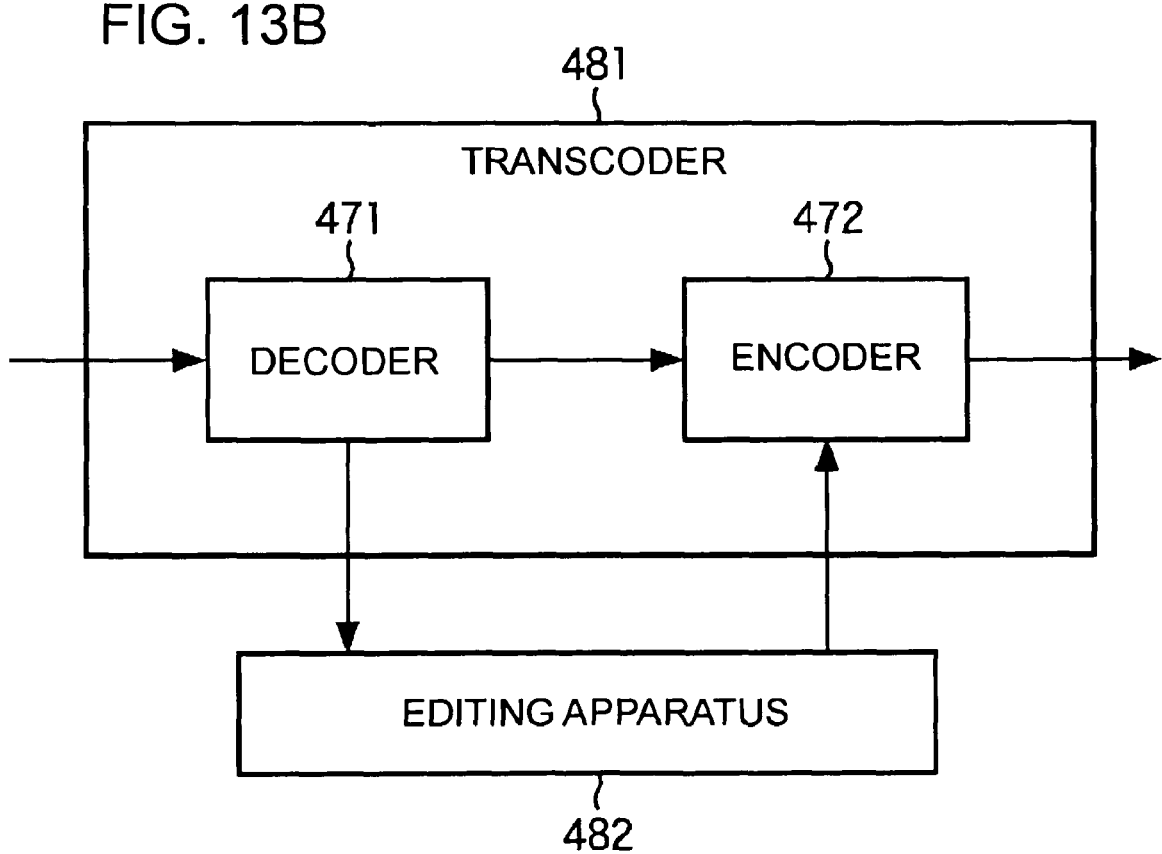

In addition, as shown in FIG. 13B, a transcoder 481 including the decoder 471 that performs partial decoding (that performs part of a process of decoding processing) and the encoder 472 that performs partial encoding (that performs part of a process of encoding processing) can be used in the present invention. Such a transcoder 481 is used, for example, when an editing apparatus 482 that performs editing, such as splicing, that is, an editing apparatus that has functions executable by the stream splicer 25 and the effect/switch 26 of the editing apparatus 1 is used.

In addition, although the CPU 11 and the CPU 20 are independently configured in the foregoing embodiment, the CPU 11 and the CPU 20 may be configured as a single CPU that controls the entire editing apparatus 1. Similarly, although the memory 13 and the memory 21 are independently configured in the foregoing embodiment, the memory 13 and the memory 21 may be configured as a memory provided in the editing apparatus 1.

In addition, although the HDD 16, the decoders 22 to 24, the stream splicer 25, the effect/switch 26, and the encoder 27 are connected to each other via bridges and buses and are integrated as an editing apparatus in the foregoing embodiment, for example, part of the component parts may be externally connected via wire or wireless communication. Alternatively, the component parts may be connected to each other in various connection forms.

In addition, although a compressed material to be edited is stored in an HDD in the foregoing embodiment, for example, editing can be performed for a material recorded on various recording media, such as optical discs, magnetic optical discs, semiconductor memories, and magnetic discs.

In addition, in the foregoing embodiment, the decoders 22 to 24, the stream splicer 25, the effect/switch 26, and the encoder are not necessarily installed in the same expansion card, such as a PCI card or a PCI-Express card. For example, if high transfer speed between cards can be achieved by a PCI-Express technology or the like, each of the decoders 22 to 24, the stream splicer 25, the effect/switch 26, and the encoder 27 may be installed in an individual expansion card.

Embodiments of the present invention are not necessarily limited to the foregoing embodiment. Various changes can be made to the present invention without departing from the spirit and the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus controlling processing for performing editing by splicing first compressed image data and second compressed image data at an editing point, the apparatus comprising:
    acquiring means for acquiring the amount of code of a portion of the first compressed image data in the vicinity of a start point of a first range around the editing point and the amount of code of a portion of the second compressed image data in the vicinity of an end point of the first range around the editing point;
    analyzing means for analyzing a first locus of virtual buffer occupancies when a case in which the virtual buffer occupancy at the start point is minimum when the portion of the first compressed image data in the vicinity of the start point is decoded and re-encoded is assumed and for analyzing a second locus of virtual buffer occupancies when a case in which the virtual buffer occupancy of a picture next to the end point is maximum when the portion of the second compressed image data in the vicinity of the end point is decoded and re-encoded is assumed, in accordance with the amounts of code acquired by the acquiring means; and
    determining means for determining, in accordance with the first locus and the second locus analyzed by the analyzing means, an upper limit of the virtual buffer occupancy at the start point and a lower limit of the virtual buffer occupancy at the end point when the first range is re-encoded,
    wherein the length of the first range is predetermined according to an encoding method, and the first locus and the second locus are associated with image data that are outside the first range.

2. The information processing apparatus according to claim 1, wherein the determining means determines, as the upper limit of the virtual buffer occupancy at the start point when the first range is re-encoded, the virtual buffer occupancy at the start point in a third locus acquired by modifying the first locus in a direction of an increase in the virtual buffer occupancy by the amount of code of the largest underflow in the first locus in an area that is not included in the first range.

3. The information processing apparatus according to claim 1, wherein the determining means determines, as the lower limit of the virtual buffer occupancy at the end point when the first range is re-encoded, the virtual buffer occupancy at the end point in a third locus acquired by modifying the second locus in a direction of a decrease in the virtual buffer occupancy by the amount of code acquired from an integrated value of a period during which the virtual buffer occupancy is maximum and the maximum bit rate in the second locus in an area that is not included in the first range.

4. The information processing apparatus according to claim 1, further comprising re-encoding range setting means for setting, as a re-encoding range of the first compressed image data and the second compressed image data that are decoded and spliced together at the editing point, a second range that is wider than the first range in accordance with the first locus and the second locus analyzed by the analyzing means.

5. The information processing apparatus according to claim 4, wherein the re-encoding range setting means sets, as a start point of the second range, a position at which the virtual buffer occupancy is the highest in the first locus in an area that is not included in the first range.

6. The information processing apparatus according to claim 4, wherein the re-encoding range setting means sets, as an end point of the second range, a position at which the virtual buffer occupancy is the lowest in the second locus in an area that is not included in the first range.

7. The information processing apparatus according to claim 4, wherein the determining means acquires an upper limit of the virtual buffer occupancy at a start point of the second range and a lower limit of the virtual buffer occupancy at an end point of the second range when the second range set by the re-encoding range setting means is re-encoded.

8. The information processing apparatus according to claim 1, further comprising:
    decoding means for decoding compressed image data in a predetermined range including the first range from among the first compressed image data and the second compressed image data;
    splicing means for splicing a first uncompressed image signal generated by decoding of the first compressed image data by the decoding means and a second uncompressed image signal generated by decoding of the second compressed image data by the decoding means at the editing point to generate a third uncompressed image signal;

encoding means for re-encoding a portion corresponding to the first range of the third uncompressed image signal spliced and generated by the splicing means to generate third compressed image data in accordance with the upper limit of the virtual buffer occupancy at the start point and the lower limit of the virtual buffer occupancy at the end point that are determined by the determining means; and edited image data generating means for generating compressed encoded edited image data by splicing the first compressed image data in a portion other than the first range, the second compressed image data in a portion other than the first range, and the third compressed image data generated by re-encoding by the encoding means.

9. An information processing method for an information processing apparatus controlling processing for performing editing by splicing first compressed image data and second compressed image data at an editing point, the method comprising the steps of:

controlling acquisition of the amount of code of a portion of the first compressed image data in the vicinity of a start point of a first range around the editing point and the amount of code of a portion of the second compressed image data in the vicinity of an end point of the first range around the editing point;

analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed;

determining, in accordance with the first locus analyzed by the step of analyzing the first locus, an upper limit of the virtual buffer occupancy at the start point when the first range is re-encoded;

analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and determining, in accordance with the second locus analyzed by the step of analyzing the second locus, a lower limit of the virtual buffer occupancy at the end point when the first range is re-encoded, wherein the length of the first range is predetermined according to an encoding method, and the first locus and the second locus are associated with image data that are outside the first range.

10. A non-transitory computer-readable medium storing a program for causing a computer to perform processing for performing editing by splicing first compressed image data and second compressed image data at an editing point, the processing comprising the steps of:

controlling acquisition of the amount of code of a portion of the first compressed image data in the vicinity of a start point of a first range around the editing point and the amount of code of a portion of the second compressed image data in the vicinity of an end point of the first range around the editing point;

analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed;

determining, in accordance with the first locus analyzed by the step of analyzing the first locus, an upper limit of the virtual buffer occupancy at the start point when the first range is re-encoded;

analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and determining, in accordance with the second locus analyzed by the step of analyzing the second locus, a lower limit of the virtual buffer occupancy at the end point when the first range is re-encoded, wherein the length of the first range is predetermined according to an encoding method, and the first locus and the second locus are associated with image data that are outside the first range.

11. A recording medium on which the program as set forth in claim 10 is recorded.

12. An information processing apparatus controlling processing for performing editing by splicing first compressed image data and second compressed image data at an editing point, the apparatus comprising:

acquiring means for acquiring the amount of code of a portion of the first compressed image data in the vicinity of a start point of a first range around the editing point and the amount of code of a portion of the second compressed image data in the vicinity of an end point of the first range around the editing point;

analyzing means for analyzing a first locus of virtual buffer occupancies when a case in which the virtual buffer occupancy at the start point is minimum when the first compressed image data in the first range is decoded and re-encoded is assumed and for analyzing a second locus of virtual buffer occupancies when a case in which the virtual buffer occupancy of a picture next to the end point is maximum when the second compressed image data in the first range is decoded and re-encoded is assumed, in accordance with the amounts of code acquired by the acquiring means; and re-encoding range setting means for setting, as a re-encoding range of the first compressed image data and the second compressed image data that are decoded and spliced together at the editing point, a second range that is wider than the first range in accordance with the first locus and the second locus analyzed by the analyzing means, wherein the length of the first range is predetermined according to an encoding method, and the first locus and the second locus are associated with image data that are outside the first range.

13. The information processing apparatus according to claim 12, wherein the re-encoding range setting means sets, as a start point of the second range, a position at which the virtual buffer occupancy is the highest in the first locus in an area that is not included in the first range.

14. The information processing apparatus according to claim 12, wherein the re-encoding range setting means sets, as an end point of the second range, a position at which the virtual buffer occupancy is the lowest in the second locus in an area that is not included in the first range.

15. The information processing apparatus according to claim 12, further comprising:
    decoding means for decoding compressed image data in a predetermined range including the second range from among the first compressed image data and the second compressed image data;
    splicing means for splicing a first uncompressed image signal generated by decoding of the first compressed image data by the decoding means and a second uncompressed image signal generated by decoding of the second compressed image data by the decoding means at the editing point to generate a third uncompressed image signal;
    encoding means for re-encoding a portion corresponding to the second range set by the re-encoding range setting means of the third uncompressed image signal spliced and generated by the splicing means to generate third compressed image data; and
    edited image data generating means for generating compressed encoded edited image data by splicing the first compressed image data in a portion other than the second range, the second compressed image data in a portion other than the second range, and the third compressed image data generated by re-encoding by the encoding means.

16. An information processing method for an information processing apparatus controlling processing for performing editing by splicing first compressed image data and second compressed image data at an editing point, the method comprising the steps of:
    controlling acquisition of the amount of code of a portion of the first compressed image data in the vicinity of a start point of a first range around the editing point and the amount of code of a portion of the second compressed image data in the vicinity of an end point of the first range around the editing point;
    analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed;
    setting, in accordance with the first locus analyzed by the step of analyzing the first locus, a start point of a second range that is a re-encoding range of the first compressed image data and the second compressed image data that are spliced together at the editing point and that is wider than the first range;
    analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and
    setting, in accordance with the second locus analyzed by the step of analyzing the second locus, an end point of the second range,
    wherein the length of the first range is predetermined according to an encoding method, and the first locus and the second locus are associated with image data that are outside the first range.

17. A non-transitory computer readable medium storing a program for causing a computer to perform processing for performing editing by splicing first compressed image data and second compressed image data at an editing point, the processing comprising the steps of:
    controlling acquisition of the amount of code of a portion of the first compressed image data in the vicinity of a start point of a first range around the editing point and the amount of code of a portion of the second compressed image data in the vicinity of an end point of the first range around the editing point;
    analyzing, in accordance with the amount of code whose acquisition is controlled by the step of controlling the acquisition, a first locus of virtual buffer occupancies when a case in which the virtual buffer occupancy at the start point is minimum when the portion of the first compressed image data in the vicinity of the start point is decoded and re-encoded is assumed;
    setting, in accordance with the first locus analyzed by the step of analyzing the first locus, a start point of a second range that is a re-encoding range of the first compressed image data and the second compressed image data that are spliced together at the editing point and that is wider than the first range;
    analyzing, in accordance with the amount of code whose acquisition is controlled by the step of controlling the acquisition, a second locus of virtual buffer occupancies when a case in which the virtual buffer occupancy of a picture next to the end point is maximum when the portion of the second compressed image data in the vicinity of the end point is decoded and re-encoded is assumed; and
    setting, in accordance with the second locus analyzed by the step of analyzing the second locus, an end point of the second range,
    wherein the length of the first range is predetermined according to an encoding method, and the first locus and the second locus are associated with image data that are outside the first range.

18. A recording medium on which the program as set forth in claim 17 is recorded.

19. An information processing apparatus controlling processing for performing editing by splicing first compressed image data and second compressed image data at an editing point, the apparatus comprising:
    an acquisition unit that acquires the amount of code of a portion of the first compressed image data in the vicinity of a start point of a first range around the editing point and the amount of code of a portion of the second compressed image data in the vicinity of an end point of the first range around the editing point;
    an analyzer that analyzes a first locus of virtual buffer occupancies when a case in which the virtual buffer occupancy at the start point is minimum when the portion of the first compressed image data in the vicinity of the start point is decoded and re-encoded is assumed and for analyzing a second locus of virtual buffer occupancies when a case in which the virtual buffer occupancy of a picture next to the end point is maximum when the portion of the second compressed image data in the vicinity of the end point is decoded and re-encoded is assumed, in accordance with the amounts of code acquired by the acquisition unit; and a determination unit that determines, in accordance with the first locus and the second locus analyzed by the analyzer, an upper limit of the virtual buffer occupancy at the start point and a lower limit of the virtual buffer occupancy at the end point when the first range is re-encoded, wherein the length of the first range is predetermined according to an encoding method, and the first locus and the second locus are associated with image data that are outside the first range.

20. An information processing apparatus controlling processing for performing editing by splicing first compressed image data and second compressed image data at an editing point, the apparatus comprising:

an acquisition unit that acquires the amount of code of a portion of the first compressed image data in the vicinity of a start point of a first range around the editing point and the amount of code of a portion of the second compressed image data in the vicinity of an end point of the first range around the editing point;

an analyzer that analyzes a first locus of virtual buffer occupancies when a case in which the virtual buffer occupancy at the start point is minimum when the first compressed image data in the first range is decoded and re-encoded is assumed and for analyzing a second locus of virtual buffer occupancies when a case in which the virtual buffer occupancy of a picture next to the end point is maximum when the second compressed image data in the first range is decoded and re-encoded is assumed, in accordance with the amounts of code acquired by the acquisition unit; and a re-encoding range setting unit that sets, as a re-encoding range of the first compressed image data and the second compressed image data that are decoded and spliced together at the editing point, a second range that is wider than the first range in accordance with the first locus and the second locus analyzed by the analyzer, wherein the length of the first range is predetermined according to an encoding method, and the first locus and the second locus are associated with image data that are outside the first range.

* * * * *